US011096181B2

(12) United States Patent
Sun et al.

(10) Patent No.: US 11,096,181 B2
(45) Date of Patent: Aug. 17, 2021

(54) MONITORING INTERFERENCE LEVEL TO SELECTIVELY CONTROL USAGE OF A CONTENTION-BASED PROTOCOL

(71) Applicant: QUALCOMM Incorporated, San Diego, CA (US)

(72) Inventors: Jing Sun, San Diego, CA (US); Sanaz Barghi, Carlsbad, CA (US); Chirag Sureshbhai Patel, San Diego, CA (US); Mohammad Naghshvar, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/876,013

(22) Filed: Jan. 19, 2018

(65) Prior Publication Data

US 2018/0220428 A1    Aug. 2, 2018

Related U.S. Application Data

(60) Provisional application No. 62/452,344, filed on Jan. 30, 2017.

(51) Int. Cl.
*H04W 72/08*     (2009.01)
*H04W 74/00*     (2009.01)
(Continued)

(52) U.S. Cl.
CPC ........ *H04W 72/082* (2013.01); *H04B 17/345* (2015.01); *H04W 74/008* (2013.01);
(Continued)

(58) Field of Classification Search
None
See application file for complete search history.

(56) References Cited

U.S. PATENT DOCUMENTS 6,130,907 A * 10/2000 Chen ............... H04B 1/707
324/76.19
6,611,506 B1 * 8/2003 Huang ............. H04W 28/08
370/329

(Continued)

FOREIGN PATENT DOCUMENTS

KR    20080064697 A    7/2008

OTHER PUBLICATIONS

Shokri-Ghadikolaei H., et al., "The Transitional Behavior of Interference in Millimeter Wave Networks and Its Impact on Medium Access Control", IEEE Transactions on Communications, vol. 64, No. 2, Feb. 2016, pp. 723-740.

(Continued)

Primary Examiner — Andrew C Oh
(74) Attorney, Agent, or Firm — Holland & Hart LLP

(57) ABSTRACT

Methods, systems, and devices for wireless communication are described for monitoring interference level to selectively control usage of a contention-based protocol. In an example, a wireless device may transmit, while operating in a non-contention-based mode for a wireless link with a second wireless device, a first beamformed data transmission to the second wireless device over a shared channel. The wireless device may determine that an interference level condition is satisfied for the shared channel and transition from operating in the non-contention-based mode to operating in a contention-based mode for the wireless link based at least in part on the interference level condition being satisfied. The wireless device may perform a contention-based protocol, while operating in the contention-based mode for the wireless link with the second wireless device, prior to transmission of a second beamformed data transmission to the second wireless device over the shared channel.

30 Claims, 13 Drawing Sheets

(51) Int. Cl.
*H04B 17/345* (2015.01)
*H04W 74/02* (2009.01)
*H04L 5/00* (2006.01)
*H04W 72/04* (2009.01)
*H04B 7/0408* (2017.01)
*H04B 7/06* (2006.01)
*H04B 7/08* (2006.01)

(52) U.S. Cl.
CPC ........... *H04W 74/02* (2013.01); *H04B 7/0408* (2013.01); *H04B 7/0617* (2013.01); *H04B 7/086* (2013.01); *H04L 5/001* (2013.01); *H04L 5/0023* (2013.01); *H04L 5/0048* (2013.01); *H04L 5/0055* (2013.01); *H04W 72/046* (2013.01)

(56) References Cited

U.S. PATENT DOCUMENTS

| | | | |
|---|---|---|---|
| 8,570,970 B2 | 10/2013 | Hsu et al. | |
| 9,788,217 B2 | 10/2017 | Andreoli-Fang et al. | |
| 2002/0159514 A1* | 10/2002 | Miyoshi | H04B 17/336 375/226 |
| 2006/0052974 A1* | 3/2006 | Chen | G02B 23/16 702/150 |
| 2007/0197252 A1* | 8/2007 | Watanabe | H04W 52/12 455/522 |
| 2008/0182543 A1* | 7/2008 | Yang | H04B 1/1027 455/296 |
| 2008/0279257 A1* | 11/2008 | Vujcic | H04W 74/002 375/132 |
| 2009/0190566 A1* | 7/2009 | Kwon | H04W 74/02 370/345 |
| 2009/0303977 A1* | 12/2009 | Hsu | H04L 1/003 370/345 |
| 2010/0173665 A1* | 7/2010 | Michel | H04W 52/365 455/522 |
| 2010/0254392 A1* | 10/2010 | Katar | H04L 12/417 370/400 |
| 2011/0038342 A1* | 2/2011 | Lindskog | H04W 52/286 370/329 |
| 2011/0110240 A1* | 5/2011 | Bergquist | H04W 74/0866 370/241.1 |
| 2011/0170450 A1* | 7/2011 | Juntti | H04W 40/22 370/252 |
| 2013/0059614 A1* | 3/2013 | Kannan | H04W 72/06 455/500 |
| 2013/0303153 A1* | 11/2013 | Bontu | H04L 1/0026 455/423 |
| 2014/0029524 A1* | 1/2014 | Dimou | H04W 16/10 370/329 |
| 2014/0107835 A1* | 4/2014 | Biasi | B67D 1/0892 700/231 |
| 2014/0321313 A1* | 10/2014 | Seo | H04J 11/00 370/252 |
| 2015/0078188 A1* | 3/2015 | Xu | H04W 52/367 370/252 |
| 2015/0103779 A1* | 4/2015 | Ma | H04L 5/0053 370/329 |
| 2015/0141031 A1* | 5/2015 | Chen | H04W 52/241 455/452.2 |
| 2015/0319767 A1* | 11/2015 | Azarian Yazdi | H04W 72/082 370/252 |
| 2015/0333807 A1* | 11/2015 | Saiwai | H04L 5/0023 375/267 |
| 2015/0351028 A1* | 12/2015 | Vallath | H04W 52/0209 370/311 |
| 2015/0373694 A1* | 12/2015 | You | H04L 5/0051 370/329 |
| 2016/0029239 A1* | 1/2016 | Sadeghi | H04W 24/10 370/252 |
| 2016/0029404 A1* | 1/2016 | Aryafar | H04W 72/1231 370/277 |
| 2016/0338097 A1* | 11/2016 | Andreoli-Fang | H04L 1/187 |
| 2017/0019909 A1* | 1/2017 | Si | H04L 47/27 |
| 2017/0223737 A1 | 8/2017 | Patel et al. | |
| 2017/0264395 A1* | 9/2017 | Wakabayashi | H04L 1/1819 |
| 2018/0063736 A1* | 3/2018 | Sadeghi | H04W 72/0446 |
| 2018/0124622 A1* | 5/2018 | Van Der Velde | H04W 24/10 |
| 2018/0124825 A1* | 5/2018 | Lee | H04W 74/006 |
| 2018/0152969 A1* | 5/2018 | Tao | H04L 43/16 |
| 2018/0220461 A1 | 8/2018 | Shi et al. | |
| 2019/0013883 A1* | 1/2019 | Tercero Vargas | H04B 7/0413 |

OTHER PUBLICATIONS

International Search Report and Written Opinion—PCT/US2018/014699—ISA/EPO—dated Apr. 10, 2018.
Taiwan Search Report—TW107102174—TIPO—dated May 11, 2021).

* cited by examiner

Mutual Interference

Directional Interference

MONITORING INTERFERENCE LEVEL TO SELECTIVELY CONTROL USAGE OF A CONTENTION-BASED PROTOCOL

CROSS REFERENCES

The present Application for Patent claims priority to U.S. Provisional Patent Application No. 62/452,344 by Sun, et al., entitled "Monitoring Interference Level To Selectively Control Usage of a Contention-Based Protocol," filed Jan. 30, 2017, assigned to the assignee hereof.

BACKGROUND

The following relates generally to wireless communication, and more specifically to monitoring interference level to selectively control usage of a contention-based protocol.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Multiple-access systems include code division multiple access (CDMA) systems, time division multiple access (TDMA) systems, frequency division multiple access (FDMA) systems, and orthogonal frequency division multiple access (OFDMA) systems, and the like. Examples of multiple-access systems using these technologies include a wireless local area network (WLAN) system, a Long Term Evolution (LTE) system, an LTE-Advanced (LTE-A) system, or a New Radio (NR) system. A wireless multiple-access communications system may include a number of base stations or access network nodes, each simultaneously supporting communication for multiple communication devices, which may be otherwise known as user equipment (UE).

Some modes of communication may enable communication between devices (e.g., between a base station and a UE) over shared radio frequency spectrum bands. Shared radio frequency spectrum bands may be used opportunistically by devices associated with different networks or non-network associated devices. This is in contrast to a carrier in a licensed radio frequency spectrum band that is allocated for use by only certain devices (e.g., devices of one public land mobile network (PLMN)). Devices may contend for access to the shared radio frequency spectrum band using listen-before-talk (LBT) procedures, in which a device may monitor the shared radio frequency spectrum band to confirm that another device is not transmitting using the medium before initiating a transmission.

Wireless communication systems have expanded the use of millimeter wave (mmW) frequencies. In some instances, mmW transmissions have a larger path loss and can be blocked by buildings, trees, or the like. Because of these and other issues, beamforming is a technique used to improve a signal to interference plus noise ratio (SINR) for mmW transmissions. To beamform, a transmitter uses an array of antennas to focus a radiated electromagnetic signal in the direction of a receiver. Conventional wireless communication systems that utilize shared radio frequency spectrum bands, however, may not operate efficiently for mmW transmissions.

SUMMARY

The described techniques relate to improved methods, systems, devices, or apparatuses that support monitoring interference levels to selectively control usage of a contention-based protocol. Generally, the described techniques provide for monitoring interference level to selectively control usage of a contention-based protocol. Described examples include a wireless device monitoring interference over a shared channel on a wireless link. If an interference level condition is satisfied, the transmitter may unilaterally transition to a contention-based mode, the receiver may instruct the transmitter to transition to a contention-based mode, or both. A transmitter may then transmit a beamformed data transmission while utilizing a contention-based protocol. The wireless device may then determine that the interference level condition is no longer satisfied for the shared channel. Upon the determination, the wireless device may transition from operating in a contention-based mode to operating in a non-contention-based mode for the wireless link. The transmitter may then once again transmit beamformed data while utilizing a non-contention-based protocol. The techniques may thus selectively control usage of a contention-based protocol to more efficiently utilize a shared channel for beamformed transmissions.

A method of wireless communication by a first wireless device is described. The method may include transmitting, while operating in a non-contention-based mode for a wireless link with a second wireless device, a first beamformed data transmission to the second wireless device over a shared channel, determining that an interference level condition is satisfied for the shared channel, transitioning from operating in the non-contention-based mode to operating in a contention-based mode for the wireless link based at least in part on the interference level condition being satisfied, and performing a contention-based protocol, while operating in the contention-based mode for the wireless link with the second wireless device, prior to transmission of a second beamformed data transmission to the second wireless device over the shared channel.

An apparatus for wireless communication is described. The apparatus may include means for transmitting, while operating in a non-contention-based mode for a wireless link with a second wireless device, a first beamformed data transmission to the second wireless device over a shared channel, means for determining that an interference level condition is satisfied for the shared channel, means for transitioning from operating in the non-contention-based mode to operating in a contention-based mode for the wireless link based at least in part on the interference level condition being satisfied, and means for performing a contention-based protocol, while operating in the contention-based mode for the wireless link with the second wireless device, prior to transmission of a second beamformed data transmission to the second wireless device over the shared channel.

Another apparatus for wireless communication is described. The apparatus may include a processor, memory in electronic communication with the processor, and instructions stored in the memory. The instructions may be operable to cause the processor to transmit, while operating in a non-contention-based mode for a wireless link with a second wireless device, a first beamformed data transmission to the second wireless device over a shared channel, determine that an interference level condition is satisfied for the shared channel, transition from operating in the non-contention-based mode to operating in a contention-based mode for the wireless link based at least in part on the interference level condition being satisfied, and perform a contention-based protocol, while operating in the contention-based mode for the wireless link with the second wireless device, prior to transmission of a second beamformed data transmission to the second wireless device over the shared channel.

A non-transitory computer readable medium for wireless communication is described. The non-transitory computer-readable medium may include instructions operable to cause a processor to transmit, while operating in a non-contention-based mode for a wireless link with a second wireless device, a first beamformed data transmission to the second wireless device over a shared channel, determine that an interference level condition is satisfied for the shared channel, transition from operating in the non-contention-based mode to operating in a contention-based mode for the wireless link based at least in part on the interference level condition being satisfied, and perform a contention-based protocol, while operating in the contention-based mode for the wireless link with the second wireless device, prior to transmission of a second beamformed data transmission to the second wireless device over the shared channel.

Some examples of the method, apparatus, and non-transitory computer-readable medium described above may further include processes, features, means, or instructions for determining that the interference level condition may be no longer satisfied for the shared channel. Some examples of the method, apparatus, and non-transitory computer-readable medium described above may further include processes, features, means, or instructions for transitioning from operating in the contention-based mode to operating in the non-contention-based mode for the wireless link based at least in part on the interference level condition no longer being satisfied. Some examples of the method, apparatus, and non-transitory computer-readable medium described above may further include processes, features, means, or instructions for transmitting, while operating in the non-contention-based mode for the wireless link with the second wireless device, a third beamformed data transmission to the second wireless device over the shared channel.

Some examples of the method, apparatus, and non-transitory computer-readable medium described above may further include processes, features, means, or instructions for monitoring interference on the wireless link. Some examples of the method, apparatus, and non-transitory computer-readable medium described above may further include processes, features, means, or instructions for determining a beam direction of the second beamformed data transmission.

Some examples of the method, apparatus, and non-transitory computer-readable medium described above may further include processes, features, means, or instructions for monitoring interference on the wireless link comprises determining a level of interference due to a second wireless link based at least in part on a reference signal (RS), a demodulation reference signal (DMRS), a phase tracking reference signal (PTRS), or any combination thereof.

In some examples of the method, apparatus, and non-transitory computer-readable medium described above, monitoring interference on the wireless link comprises: determining a ratio of message acknowledgments to negative acknowledgments communicated by the second wireless device.

In some examples of the method, apparatus, and non-transitory computer-readable medium described above, determining that the interference level condition may be satisfied comprises: determining that a variation in a level of monitored interference over a time period satisfies a threshold.

In some examples of the method, apparatus, and non-transitory computer-readable medium described above, determining that the interference level condition may be satisfied comprises: determining a difference between a maximum observed value of the monitored interference and a minimum observed value of the monitored interference within a time period. Some examples of the method, apparatus, and non-transitory computer-readable medium described above may further include processes, features, means, or instructions for determining that the difference satisfies a threshold.

In some examples of the method, apparatus, and non-transitory computer-readable medium described above, determining that the interference level condition may be satisfied comprises: determining that a level of the monitored interference satisfies a bursty metric.

In some examples of the method, apparatus, and non-transitory computer-readable medium described above, determining that the interference level condition may be satisfied comprises: determining that a magnitude of a level of the monitored interference satisfies a threshold.

In some examples of the method, apparatus, and non-transitory computer-readable medium described above, the contention-based protocol may be a listen before talk (LBT) protocol or a channel reservation (CR) LBT protocol.

A method of wireless communication by a first wireless device is described. The method may include determining that a second wireless device is transmitting a beamformed data transmission over a shared channel while operating in a non-contention-based mode, determining that an interference level condition is satisfied for a wireless link over the shared channel, and instructing the second wireless device to transition from operating in the non-contention-based mode to operating in a contention-based mode based at least in part on the interference level condition being satisfied.

An apparatus for wireless communication is described. The apparatus may include means for determining that a second wireless device is transmitting a beamformed data transmission over a shared channel while operating in a non-contention-based mode, means for determining that an interference level condition is satisfied for a wireless link over the shared channel, and means for instructing the second wireless device to transition from operating in the non-contention-based mode to operating in a contention-based mode based at least in part on the interference level condition being satisfied.

Another apparatus for wireless communication is described. The apparatus may include a processor, memory in electronic communication with the processor, and instructions stored in the memory. The instructions may be operable to cause the processor to determine that a second wireless device is transmitting a beamformed data transmission over a shared channel while operating in a non-contention-based mode, determine that an interference level condition is satisfied for a wireless link over the shared channel, and instruct the second wireless device to transition from operating in the non-contention-based mode to operating in a contention-based mode based at least in part on the interference level condition being satisfied.

A non-transitory computer readable medium for wireless communication is described. The non-transitory computer-readable medium may include instructions operable to cause a processor to determine that a second wireless device is transmitting a beamformed data transmission over a shared channel while operating in a non-contention-based mode, determine that an interference level condition is satisfied for a wireless link over the shared channel, and instruct the second wireless device to transition from operating in the non-contention-based mode to operating in a contention-based mode based at least in part on the interference level condition being satisfied.

In some examples of the method, apparatus, and non-transitory computer-readable medium described above, the wireless link may be between the second wireless device and the first wireless device.

Some examples of the method, apparatus, and non-transitory computer-readable medium described above may further include processes, features, means, or instructions for identifying the second wireless device as being a source of interference for the wireless link.

In some examples of the method, apparatus, and non-transitory computer-readable medium described above, instructing the second wireless device to transition from operating in the non-contention-based mode to operating in the contention-based mode comprises: communicating a message to the second wireless device via a backhaul link.

In some examples of the method, apparatus, and non-transitory computer-readable medium described above, instructing the second wireless device to transition from operating in the non-contention-based mode to operate in the contention-based mode comprises: transmitting a signal waveform to the second wireless device.

Some examples of the method, apparatus, and non-transitory computer-readable medium described above may further include processes, features, means, or instructions for determining that the interference level condition may be no longer satisfied. Some examples of the method, apparatus, and non-transitory computer-readable medium described above may further include processes, features, means, or instructions for instructing the second wireless device to transition from operating in the contention-based mode to operating in the non-contention-based mode based at least in part on the interference level condition no longer being satisfied.

In some examples of the method, apparatus, and non-transitory computer-readable medium described above, determining that the interference level condition may be satisfied comprises: monitoring interference on the wireless link.

In some examples of the method, apparatus, and non-transitory computer-readable medium described above, monitoring the interference on the wireless link comprises: determining a level of interference caused by the second wireless device based at least in part on a reference signal (RS), a demodulation reference signal (DMRS), a phase tracking reference signal (PTRS), or any combination thereof.

In some examples of the method, apparatus, and non-transitory computer-readable medium described above, monitoring the interference on the wireless link comprises: determining a ratio of message acknowledgments to negative acknowledgments for data transmissions received by the first wireless device.

In some examples of the method, apparatus, and non-transitory computer-readable medium described above, determining that the interference level condition may be satisfied comprises: determining that a variation in a level of monitored interference over a time period satisfies a threshold.

In some examples of the method, apparatus, and non-transitory computer-readable medium described above, determining that the interference level condition may be satisfied comprises: determining a difference between a maximum observed value of the monitored interference and a minimum observed value of the monitored interference within a time period. Some examples of the method, apparatus, and non-transitory computer-readable medium described above may further include processes, features, means, or instructions for determining that the difference satisfies a threshold.

In some examples of the method, apparatus, and non-transitory computer-readable medium described above, determining that the interference level condition may be satisfied comprises: determining that a level of the monitored interference satisfies a bursty metric.

In some examples of the method, apparatus, and non-transitory computer-readable medium described above, determining that the interference level condition may be satisfied comprises: determining that a magnitude of a level of the monitored interference satisfies a threshold.

In some examples of the method, apparatus, and non-transitory computer-readable medium described above, the contention-based protocol may be a listen before talk (LBT) protocol or a channel reservation (CR) LBT protocol.

DETAILED DESCRIPTION

Figure 1:
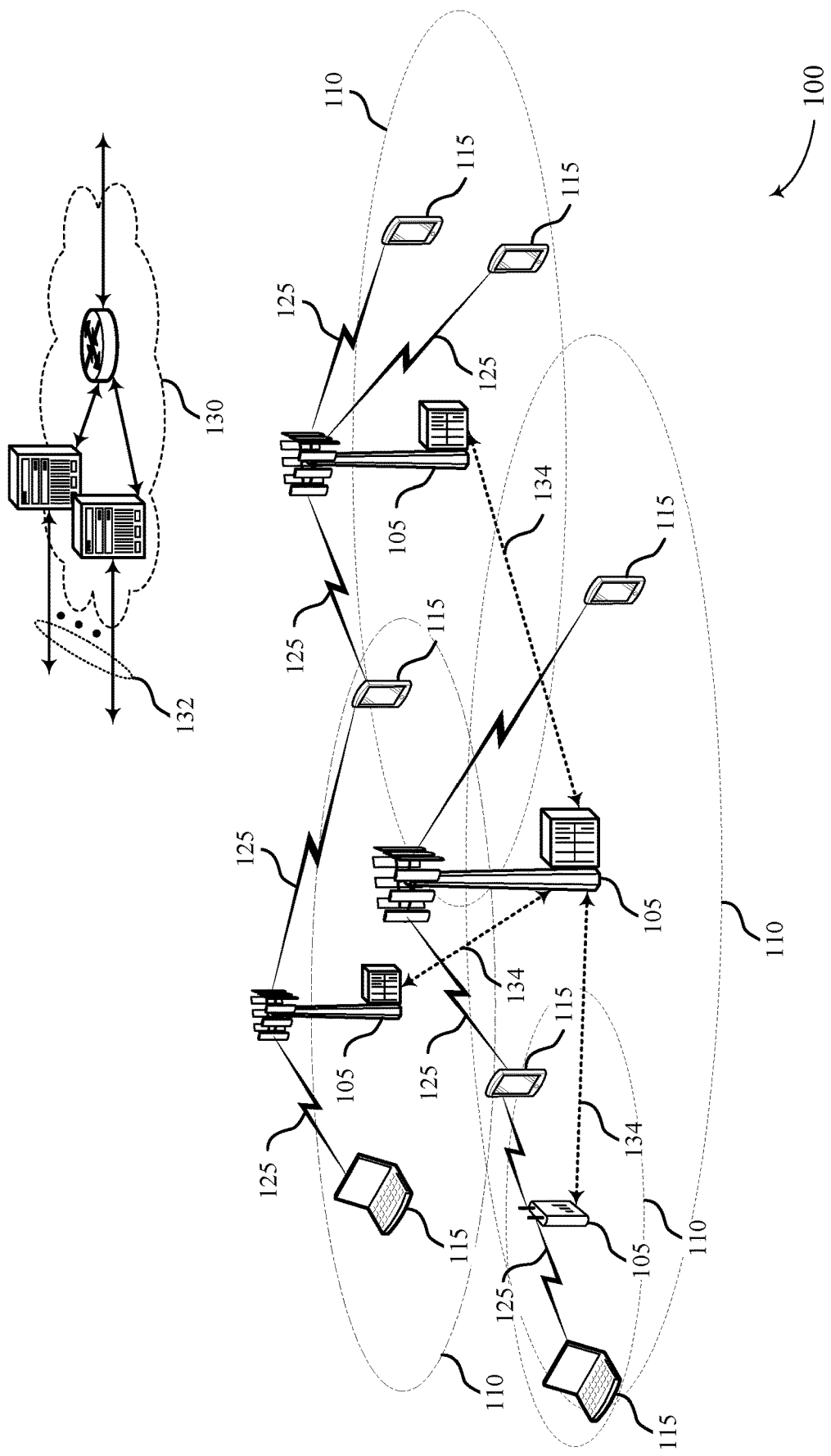
FIG. 1 illustrates an example of a system for wireless communication that supports monitoring interference level to selectively control usage of a contention-based protocol in accordance with aspects of the present disclosure.

Techniques are described that support monitoring interference levels to selectively control usage of a contention-based protocol. The described techniques provide for monitoring interference over a shared channel on a wireless link and adaptively selecting a contention protocol based on the interference. For example, if an interference level condition is satisfied, the transmitter may unilaterally transition to a contention-based mode, the receiver may instruct the transmitter to transition to a contention-based mode, or both. If upon determining that the interference level condition is no longer satisfied, the transmitter may unilaterally transition back to a non-contention-based mode, the receiver may instruct the transmitter to transition back to a non-contention-based mode, or both.

Conventional techniques fail to efficiently use shared channels employing mmW transmissions by requiring use of a contention-based protocol prior to each mmW transmission via the shared channel (e.g., a channel of an unlicensed frequency spectrum band, or a channel of a frequency spectrum band that is licensed to a primary operator but allows opportunistic access for other devices). A contention-based protocol is designed to prevent data collisions whereby multiple devices interfere with one another by communicating on the shared channel at the same (or overlapping) times on the same (or overlapping) frequencies. In an attempt to avoid such interference, a wireless device may perform a contention-based protocol prior to each transmission. For instance, a wireless device may send a transmission to reserve the shared channel before transmitting or may listen to the shared channel to confirm that the shared channel is not currently being used before transmitting.

Two types of contention-based protocols used by conventional techniques include the ready to send/clear to send (RTS/CTS) listen before talk (LBT) protocol and the target preamble LBT protocol. In the RTS/CTS LBT protocol, a first device desiring to transmit data sends a ready to send (RTS) message to a second device before transmitting the data. The second device sends a clear to send (CTS) message informing the first device and other nearby devices that the second device is ready to receive transmission of the data. When other devices are preparing to transmit data, they wait until the transmission between the first and second devices is complete (or a backoff time) before sending an RTS for their own transmission to avoid collisions. In the target preamble LBT protocol, before transmitting data, a device detects preambles included in transmissions by other devices to estimate the number of other devices using the shared channel. The device may select whether to transmit its data on the shared channel based on the estimated number of other devices using the shared channel.

Performing a contention-based protocol, however, detrimentally impacts channel reuse. Channel reuse refers to an amount of data throughput via the shared channel for a system having multiple devices communicating concurrently in different combinations. Performing a contention-based protocol prior to each transmission lowers data throughput. Moreover, the reduction in channel reuse is not offset by an increase in gain in a signal to interference plus noise ratio (SINR) incurred by performing a contention-based protocol prior to transmission. Performing an RTS/CTS LBT protocol, may for example, achieve a gain of 3 dB or 6 dB in SINR where there are multiple co-interfering communication links. The amount of this SINR gain, however, is more than offset by the detrimental impact on channel reuse. The target preamble LBT protocol also detrimentally impacts channel reuse by requiring a wireless device to monitor the shared channel for preambles of other devices using the shared channel.

The example embodiments overcome the deficiencies in conventional systems by monitoring interference on a shared channel for selectively controlling when to use a contention-based protocol. The default mode of operation may be to not use a contention-based protocol, and hence the example embodiments achieve lower reuse loss as compared to conventional systems. To avoid interference from detrimental interference conditions impacting channel throughput, a level of interference on the shared channel is monitored, and a contention-based protocol is used prior to transmissions when an interference level condition is satisfied.

Aspects of the disclosure are initially described in the context of a wireless communications system. The wireless communications system may enable coordination between a transmitter and a receiver to selectively control when to use a contention-based protocol. Aspects of the disclosure are further illustrated by and described with reference to apparatus diagrams, system diagrams, and flowcharts that relate to monitoring interference level to selectively control usage of a contention-based protocol.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices.

Any combination of transmitters and receivers, such as base stations 105 and UEs 115, may coordinate to selectively control when to use a contention-based protocol. In some instances, the base station 105 may be the transmitter and the UE 115 may be the receiver. In other instances, the UE 115 may be the transmitter and the base station 105 may be the receiver. In further instances, a first base station 105 may be the transmitter and a second base station 105 may be the receiver. In additional instances, a first UE 115 may be the transmitter and a second UE 115 may be the receiver. Devices other than a base station and a UE may also be one or both of the transmitter and receiver.

In an example, a base station 105 may initially transmit over a channel in a shared radio frequency spectrum band without performing a contention-based protocol prior to transmission to a UE 115. The base station 105, the UE 115, or both, may monitor an interference level on the shared channel. In an example, the base station 105 may determine that an interference level condition is satisfied for the shared channel and transition from operating in a non-contention-based mode to operating in a contention-based mode. While operating in the contention-based mode, the base station 105 may perform a contention-based protocol prior to subsequent transmissions over the shared channel. In another example, the UE 115 may determine that the base station 105 is transmitting over a shared channel while operating in a non-contention-based mode. The UE 115 may monitor an interference level and determine that an interference level condition is satisfied for the shared channel. The UE 115 may instruct the base station 105 to transition from operating in the non-contention-based mode to operating in a contention-based mode for subsequent transmissions.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one MME, at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices, such as base station 105 may include subcomponents such as an access network entity 105, which may be an example of an access node controller (ANC). Each access network entity 105 may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted in different directions (e.g., each transmission may be beamformed differently). A mmW receiver (e.g., a UE 115) may use receive beamforming (e.g., applying beamforming weights to multiple signals received via an antenna array) while receiving signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Conventional techniques fail to efficiently use a shared channel during mmW transmissions by requiring use of a contention-based protocol prior to each mmW transmission via the shared channel. The example embodiments overcome the deficiencies in conventional systems by monitoring interference on a shared channel for selectively controlling when to use a contention-based protocol.

Figure 2:
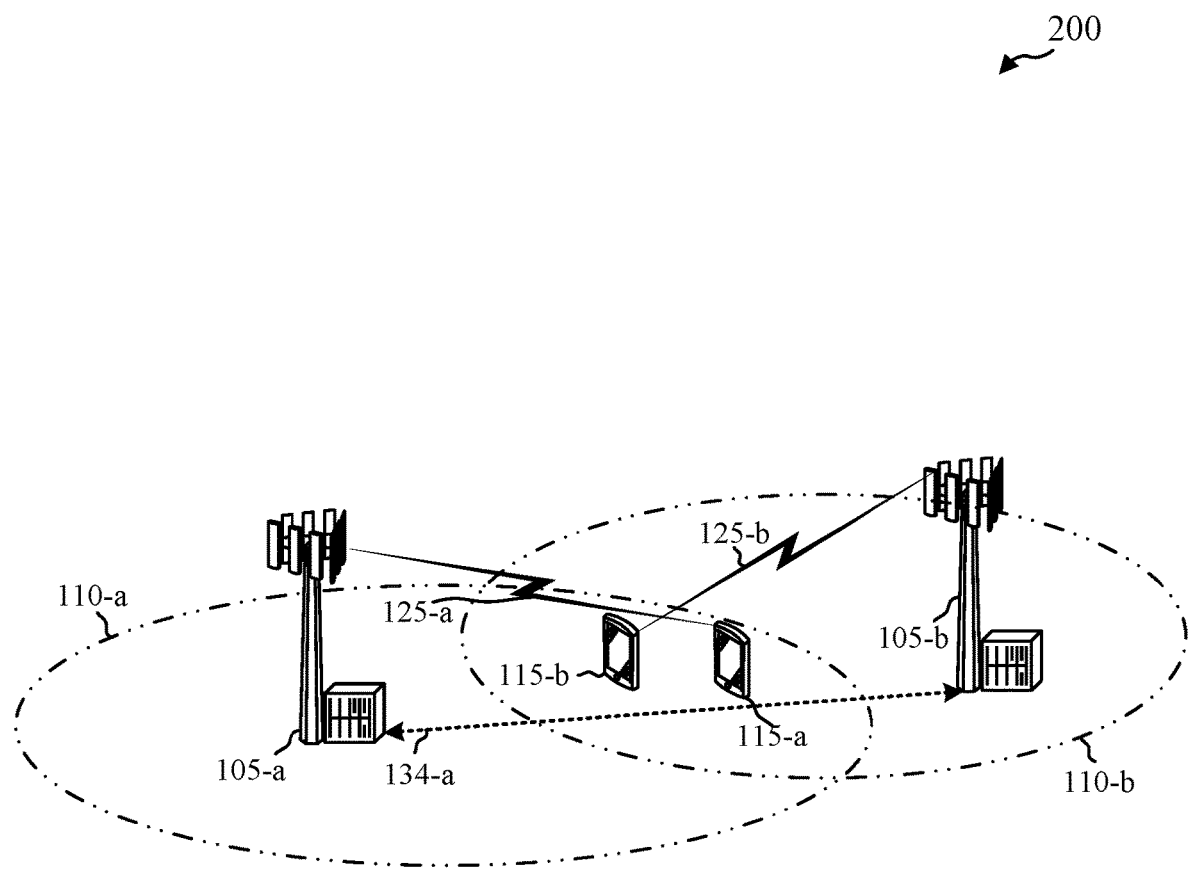
FIG. 2 illustrates an example of a wireless communication system that supports monitoring interference level to selectively control usage of a contention-based protocol in accordance with aspects of the present disclosure.

FIG. 2 illustrates an example of a wireless communication system 200 for monitoring interference levels to selectively control usage of a contention-based protocol. Wireless communication system 200 may include a first base station 105-a having a first coverage area 110-a, and a second base station 105-b having a second coverage area 110-b, and first and second UEs 115-a, 115-b within the first and second coverage areas 110-a, 110-b. Base stations 105-a and 105-b may communicate with one another via a backhaul link 134-a. Base station 105-a may establish and communicate with UE 115-a via a wireless communication link 125-a, and base station 105-b may establish and communicate with UE 115-b via a wireless communication link 125-b. Base stations 105-a and 105-b, are examples of base station 105, and UEs 115-a and 115-b are examples of UE 115 of FIG. 1. Any of the base stations 105-a and 105-b, and UEs 115-a and 115-b may be a transmitter that potentially causes interference for a receiver. Any of the base stations 105-a and 105-b, and UEs 115-a and 115-b may be a receiver that receives a transmission from a transmitter. In some instances, a transmitter of one communication link 125 may cause interference to a receiver of another communication link 125.

Figure 3A:
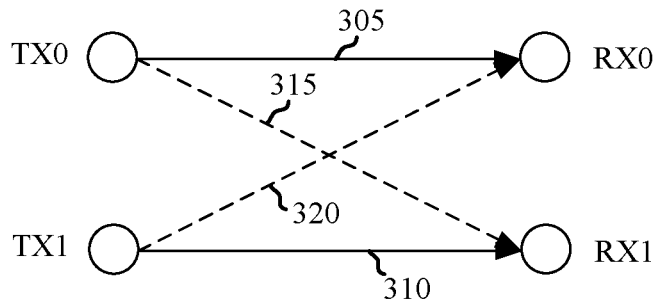
FIG. 3A-3B illustrates an example depiction of mutual and directional interference that supports monitoring interference level to selectively control usage of a contention-based protocol in accordance with aspects of the present disclosure.
Figure 3B:
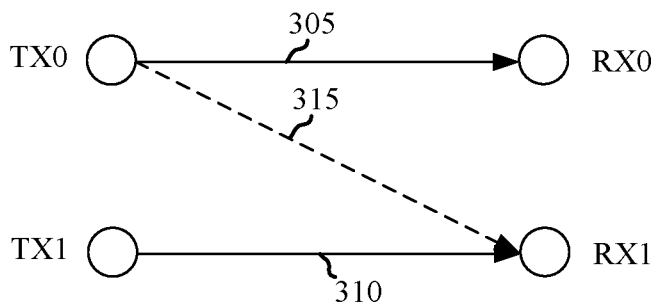

Two types of interference are mutual interference and directional interference. FIGS. 3A-3B illustrate example diagrams 300-a and 300-b for monitoring interference levels to selectively control usage of a contention-based protocol. FIG. 3A depicts mutual interference, and FIG. 3B depicts directional interference. FIGS. 3A-3B illustrate two transmitters on the left, TX0 and TX1, and illustrate two receivers on the right, RX0 and RX1. In this example, transmitters TX0 and TX1 are described as base stations 105 and receivers RX0 and RX1 are described as UEs 115. In other examples, transmitters TX0 and TX1 may be UEs 115 and receivers RX0 and RX1 may be base stations 105. In further examples, one of transmitters TX0 and TX1 may be a base station 105 and the other may be a UE 115, and one of receivers RX0 and RX1 may be a base station 105 and the other may be a UE 115. Other permutations are contemplated and permitted. Moreover, the principles described herein may apply to one or more transmitters and two or more receivers.

In each of FIGS. 3A-3B, a transmitter may establish a wireless link with a receiver. As depicted in each, transmitter TX0 establishes a wireless link 305 with a receiver RX0 and transmitter TX1 establishes a wireless link 310 with a receiver RX1. For example, wireless link 305 may correspond to wireless communication link 125-a between base station 105-a and UE 115-a, and wireless link 310 may correspond to wireless communication link 125-b between base station 105-b and UE 115-b.

In some instances, transmissions by one or both of the transmitters TX0 and TX1 may generate interference that negatively impacts the ability of one or both of the receivers RX0 and RX1 to receive a transmission via its respective wireless link. Mutual interference refers to the situation where multiple receivers experience interference due to transmissions by multiple transmitters. Directional interference refers to the situation where one or more receivers experience interference due to transmissions by a single transmitter. In mutual interference shown in FIG. 3A, transmissions by each transmitter TX0 and TX1 cause interference for each of receivers RX0 and RX1. For instance, transmitter TX0 may include an array of antennas that emits an electromagnetic signal focused into a directional beam that radiates in the direction of receiver RX0 via link 305.

Even though beamforming is used to steer the directional beam toward a particular receiver RX0, the directional beam may radiate in other directions. In an example, beamforming may focus radiated energy in a particular direction that creates a primary lobe in the particular direction but also radiates energy in one or more secondary lobes in other directions. The primary lobe may have the direction having the greatest signal strength (e.g., at an angle of 45 degrees), but a transmitter may also radiate energy having a lower signal strength in other directions (e.g., at angles of 30 and 60 degrees). For example, transmitter TX0 may transmit a directional data transmission over a directional beam to receiver RX0 via link 305 (e.g., primary lobe emitted at 0 degrees) where a portion 315 of the directional beam (e.g., secondary lobe emitted at −30 degrees) radiates toward, and causes interference at, receiver RX1. Likewise, transmitter TX1 may transmit a directional data transmission over a directional beam (e.g., lobe emitted at 0 degrees) to receiver RX0 via link 310 where a portion 320 of the directional beam (e.g., secondary lobe emitted at 30 degrees) radiates toward, and causes interference at, receiver RX0.

Mutual interference may also occur due to the relative locations of transmitters and receivers. For example, mutual interference may occur when transmitters TX0 and TX1, and receivers RX0 and RX1 are oriented such that they are all lined up (or substantially along a line). In such a scenario, the primary lobes of transmitter TX0 and TX1 are focused in the same direction, thereby causing interference at the receivers RX0 and RX1. Transmitters and receivers in such an orientation may be referred to as a persistent jamming pair as the two links 305 and 310 are located at bad relative locations and keep jamming each other.

In directional interference, transmissions by only one of the transmitters causes interference at one or more receivers. As seen in FIG. 3B, transmitter TX0 may transmit a directional data transmission over a directional beam to receiver RX0 via link 305 where a portion 315 of the directional beam radiates toward, and causes interference at, receiver RX1. Transmissions by transmitter TX1, however, do not cause interference at receiver RX0. While only sets of two transmitters and receivers are depicted in FIGS. 3A-3B, the principles described herein may apply to configurations having two or more transmitters and one or more receivers.

Figure 4:
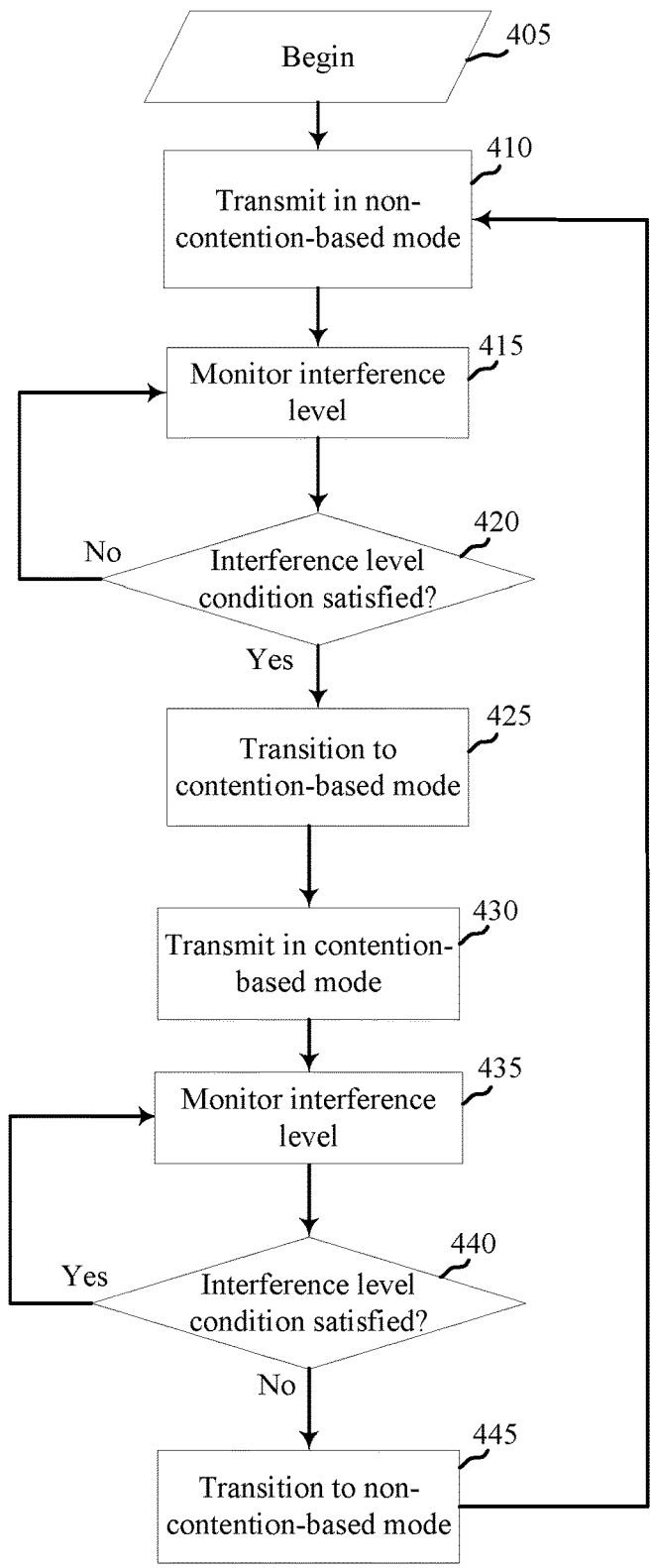
FIG. 4 illustrates an example of a flow diagram that supports monitoring interference level to selectively control usage of a contention-based protocol in accordance with aspects of the present disclosure.

A receiver, a transmitter, or both, may monitor interference and selectively control when a transmitter is to use a contention-based protocol prior to transmission. FIG. 4 illustrates an example of a flow diagram 400 for monitoring interference levels to selectively control usage of a contention-based protocol. FIG. 4 depicts a flow diagram to enable a transmitter to selectively control when to use a contention-based protocol prior to transmission, and FIG. 5, described below, depicts a flow diagram to enable a receiver to instruct a transmitter to selectively control when to use a contention-based protocol prior to transmission.

Figure 5:
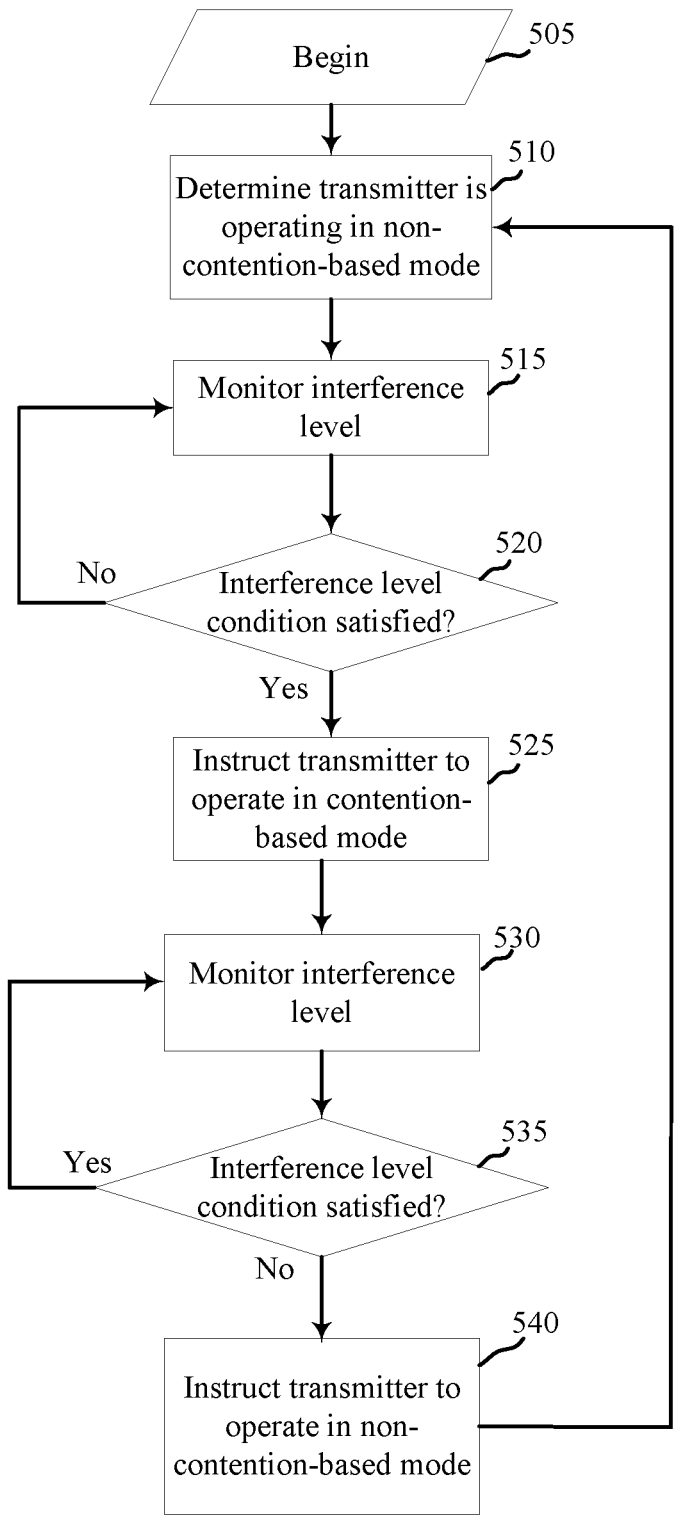
FIG. 5 illustrates an example of a flow diagram that supports monitoring interference level to selectively control usage of a contention-based protocol in accordance with aspects of the present disclosure.

In the flow diagrams of FIGS. 4-5, a transmitter has established a wireless link with a receiver for sending one or more directional data transmissions in a directional beam over a shared channel (e.g., transmitter TX0 establishing a wireless link with receiver RX0). The transmitter may include an array of antennas and use, for example, beamforming techniques. The transmitter may use a steering matrix to radiate the directional data transmissions in a directional beam that is focused in a particular direction toward the receiver, and not in other directions. Even when using beamforming techniques, a portion of the energy from the directional beam may radiate in other directions thereby potentially causing interference in those other directions. Moreover, there are times when multiple transmitters are at least somewhat aligned and transmitting in at least a similar direction toward different receivers. In that scenario, a first transmitter may transmit a first directional beam toward a first receiver that is also received by a second receiver. The first direction beam may interfere with a transmission of a second direction beam toward the second receiver.

The flow diagram of FIG. 4 may begin at 405 and proceed to 410. At 410, a transmitter TX0 may transmit, while operating in a non-contention-based mode for a wireless link with a receiver RX0, a first directional data transmission in a directional beam over a shared channel. In an example with reference to FIGS. 2 and 3A-3B, transmitters TX0 and TX1 are base stations 105-*a* and 105-*b*, and receivers RX0 and RX1 are UEs 115-*a* and 115-*b*. In this example, the default mode of operation for transmitter TX0 is the non-contention-based mode and hence the transmitter TX0 does not perform a contention-based protocol prior to transmission via the wireless link.

At 415, transmitter TX0 may monitor an interference level of the shared channel to determine whether it is jamming a receiver, such as receiver RX1. The transmitter TX0 may monitor the interference level of the shared channel in any beam emanating from the antennas or antenna arrays associated with transmitting its signals and in any beam direction. Interference may be monitored in a number of different ways. For example, transmitter TX0 may track a ratio of acknowledgement (ACKs) and negative acknowledgements (NACKs) sent by nearby receivers (e.g., receiver RX0, receiver RX1, etc.). An ACK is an indication that a receiver successfully received transmitted data. A NACK is an indication that the receiver failed to successfully receive transmitted data, and, in some instances, requests that the transmitter resend the previously transmitted data. The transmitter TX0 may monitor an ACK to NACK ratio for its receiver RX0, and/or an ACK to NACK ratio for some or all other nearby receivers.

The transmitter TX0 may also use reference signals to monitor an interference level of the shared channel. A reference signal (RS) is a signal communicated by a transmitter to enable a receiver to perform channel estimation. Examples of a RS include a demodulation reference signal (DMRS) and a phase tracking reference signal (PTRS). The transmitter TX0 may also receive data, and when receiving, the transmitter TX0 may use a downlink (DL) DMRS, a PTRS, or both, to monitor the interference level of the shared channel (e.g., after cancelling a signal received from a serving sector).

At 420, transmitter TX0 may determine whether an interference level condition is satisfied for the shared channel. The interference may be due, for example, to transmission on another wireless link (e.g., on link 310). The transmitter TX0 may also determine that interference may be due, for example, from interference that has been monitored in any beam direction.

The determination of whether the interference level condition is satisfied may be based at least in part on a current interference level, a function of the current interference level and past interference levels, or the like. In an example, transmitter TX0 may determine whether an ACK to NACK ratio satisfies a threshold. Having the ratio be at or above a threshold may indicate that a receiver is successfully receiving transmitted data with an acceptable error rate, and suggests that interference is not detrimentally impacting the receiver's ability to receive transmitted data. Conversely, having the ratio falling below the threshold may indicate that a receiver is not successfully receiving transmitted data with an acceptable error rate, and suggests that interference is detrimentally impacting the receiver's ability to receive transmitted data. The transmitter TX0 may monitor the ratio for some or all nearby receivers for determining an interference level of the shared channel. The transmitter TX0 may consider the ratios individually or collectively. In an example, transmitter TX0 may determine that the interference level condition is satisfied for the shared channel if an ACK to NACK ratio of at least one receiver falls below the threshold. In another example, transmitter TX0 may determine a ratio using a statistical metric of the ACKs (e.g., average number of ACKs within a time interval) and a statistical metric of the NACKs (e.g., average number of NACKs within the time interval), and compare the ratio to a threshold for determining whether the interference level condition is satisfied.

In another example, transmitter TX0 may determine that an interference level condition is satisfied if a magnitude of the current interference level meets or exceeds a threshold. In another example, transmitter TX0 may determine that an interference level condition is satisfied based on interference that is detected in a particular beam direction.

In a further example, transmitter TX0 may determine that an interference level condition is satisfied if interference levels satisfy a bursty metric over a time window. The bursty metric may be a determination that a level of interference changes rapidly within a period of time. In an example, to make this determination, the transmitter TX0 may determine an amount of change in the interference level over multiple interference level measurements. If the amount of change (e.g., total amount of change, min-max delta, root-mean-square of the measurements, etc.) meets or exceeds a threshold, the transmitter TX0 may determine that the bursty metric is satisfied, and also that the interference level condition is satisfied.

In another example, the transmitter TX0 may determine whether an interference level condition is satisfied based at least in part on a variation in a level of monitored interference over a time period satisfying a threshold. In an example, transmitter TX0 may identify an increase in the interference level that exceeds a historical interference level by at least a predetermined amount. To do so, transmitter TX0 may compare interference level averages of different time intervals. A first interference level average may correspond to a duration that includes the recent past (e.g., most recent 100 milliseconds), whereas a second interference level average may correspond to a longer duration that may also include the recent past (e.g., most recent 2 seconds). Transmitter TX0 may subtract the second average from the first average, and determine that the interference level condition is satisfied if the difference exceeds a threshold.

Figure 6:
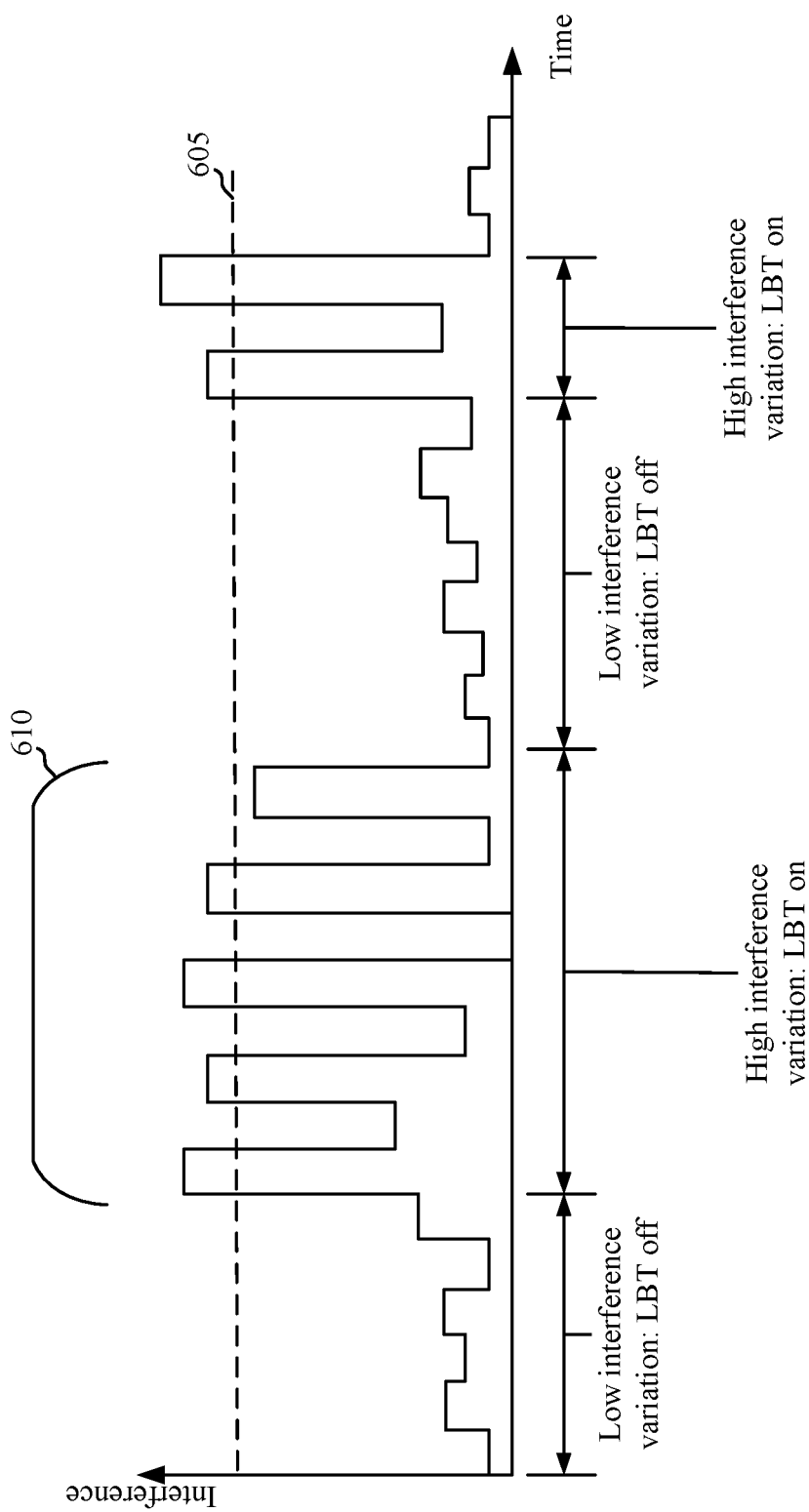
FIG. 6 illustrates an example of interference diagram that supports monitoring interference level to selectively control usage of a contention-based protocol in accordance with aspects of the present disclosure.

In another example, transmitter TX0 may determine a difference between maximum and minimum observed interference levels within a time interval. Transmitter TX0 may determine that the interference level condition is satisfied if the difference exceeds a threshold. FIG. 6, described later below, depicts an interference trace and provides additional description for determining whether an interference level condition is satisfied.

If the interference level condition is not satisfied, the flow diagram 400 may return to block 415. Transmitter TX0 may continuously, periodically, or aperiodically, monitor the interference level. In some examples, transmitter TX0 may initiate a timer when the interference level condition is not satisfied and begin monitoring the interference level after the timer expires. If the interference level condition is satisfied, the flow diagram 400 may proceed to block 425.

At 425, transmitter TX0 may transition from operating in a non-contention-based mode to operate in a contention-based mode. When in the contention-based mode, transmitter TX0 may perform a contention-based protocol prior to transmitting a directional data transmission in a wireless beam over the shared channel. The contention-based protocol may be a listen before talk (LBT) protocol, a channel reservation (CR) LBT protocol, or the like. In some examples, transmitter TX0 may avoid performing an energy-level based LBT protocol for fairness reasons. For instance, an energy-level based LBT protocol may result in the transmitter TX0 being the only transmitter that reduces how frequently it transmits thereby permitting an interfering transmitter to disproportionately use a shared channel and continue to cause interference on the shared channel.

At 430, transmitter TX0, while operating in the contention-based mode, may perform a contention-based protocol prior to at least some, or all, directional data transmissions of a wireless beam via the wireless link. In a CR LBT protocol example, transmitter TX0 may, prior to transmission, detect whether there are any channel reservation signals on the shared channel and backoff if any are detected. If none are detected, transmitter TX0 may transmit a channel reservation signal indicating a time interval when the shared channel is being reserved and transmit during the time interval. Other LBT protocols may also be performed.

At 435, transmitter TX0 may monitor an interference level of the shared channel while operating in the contention-based mode. Interference may be monitored in the same way as described above at 415.

At 440, transmitter TX0 may determine whether an interference level condition is satisfied for the shared channel. Determining whether the condition is satisfied may be determined in the same way as described above at 420. If satisfied, the flow diagram 400 may return to block 435. When returning to block 435, transmitter TX0 remains in the contention-based mode when the interference level condition remains satisfied, meaning that the interference level is high enough where interference mitigation techniques are needed to reduce interference on the shared channel. If the interference level condition is no longer satisfied, the flow diagram 400 may proceed to block 445.

At 445, transmitter TX0 may transition to operating in a contention-based mode to operate in a non-contention-based mode. By proceeding from block 440 to block 445, the interference level has been reduced meaning that interference mitigation techniques are no longer needed. Hence, the transmitter TX0 may transmit on the shared channel without performing a contention-based protocol prior to transmission. In some instances, transmitter TX0 may transition to the non-contention-based mode only after determining that the interference level condition is no longer satisfied for at least a predetermined amount of time. The predetermined amount of time may be used to confirm that an interference level of the shared channel has been reduced more than temporarily, to avoid the transmitter TX0 from having to quickly transition back and forth between the contention-based mode and the non-contention-based mode within a short amount of time. The flow diagram 400 may return to 410 and may repeat one or more times.

A receiver may similarly attempt to mitigate interference by instructing a transmitter when to transition to a contention-based mode. FIG. 5 illustrates an example of a flow diagram 500 for monitoring interference levels to selectively control usage of a contention-based protocol.

The flow diagram 500 may begin at 505 and proceed to 510. At 510, receiver RX0 may determine that a transmitter is operating in a non-contention-based mode and is transmitting a beamformed data transmission over a shared channel while operating in the non-contention-based mode. In some examples, the transmitter may be transmitter TX0 with which the receiver RX0 has set up a wireless link, and the receiver RX0 may be informed in a handshake procedure during establishment of the wireless link that the transmitter TX0 will be operating in a non-contention-based mode unless an interference level condition is satisfied. In other examples, receiver RX0 may operate within a system of transmitters and receivers that are all configured to operate in a non-contention-based mode unless an interference level condition is satisfied.

At 515, receiver RX0 may monitor an interference level of the shared channel. Interference may be monitored in the same way, or in a similar way, as described above in FIG. 4 at 415 and at 435.

At 520, receiver RX0 may determine whether an interference level condition is satisfied for the shared channel. The receiver RX0 may determine whether the interference level condition is satisfied in the same or similar manner as a transmitter, as discussed at 420. If not satisfied, the flow diagram 500 may return to block 515. Receiver RX0 may continuously, periodically, or aperiodically, monitor the interference level. In some examples, receiver RX0 may initiate a timer when the interference level condition is not satisfied and begin monitoring the interference level after the timer expires. If the interference level condition is satisfied, the flow diagram 500 may proceed to block 525.

At 525, receiver RX0 may instruct the transmitter to transition from operating in a non-contention-based mode to operate in a contention-based mode. If the transmitter is transmitter TX0, receiver RX0 may determine that the transmitter TX0 is causing intra-link interference on link 305 and send a message with a transition instruction via the wireless link (e.g., wireless link 305) previously established with transmitter TX0. If the interfering transmitter is some other transmitter, such as transmitter TX1, with which receiver RX0 does not currently have an established wireless link, receiver RX0 may identify the interferer as being the source of the interference on wireless link 305 (e.g., inter-link interference) and transmit a waveform to the interferer via the shared channel or some other link. The receiver RX0 may determine the identity of the transmitter causing the interference by processing a message transmitted by the interferer. For example, the transmitter TX1 may include its identifier (e.g., physical cell identifier, preamble, etc.) in each transmission (e.g., in reference or pilot signals), and the receiver RX0 may receive the message and extract the identifier of transmitter TX1.

The receiver RX0 may generate a waveform that includes the identifier of the transmitter TX1 (e.g., a physical cell identifier, a preamble, or the like). For example, the receiver RX0 (e.g., a victim eNB) may transmit a random access channel (RACH) waveform including a payload for notifying transmitter TX1 of the inter-link interference and instructing the transmitter TX1 (e.g., interferer eNB) to operate in the contention-based mode. In another example, if the transmitter TX1 is a first UE 115-a and the receiver RX0 is a second UE 115-b, the second UE 115-b may transmit a waveform on a downlink channel to contact and instruct the first UE 115-a to operate in the contention-based mode. In another example, the receiver RX0 and the transmitter TX1 may be base stations 105-a and 105-b that are connected by a backhaul link (e.g., via backhaul link 134-a). The receiver RX0 may transmit a message to the transmitter TX1 via the backhaul link that includes the identifier of the transmitter TX1 to notify transmitter TX1 about the inter-link interference. In any of these examples, the transmitter TX1 may receive the waveform or the message via the backhaul link, determine that the waveform or message includes its identifier, and transition to operating in a contention-based mode.

At 530, receiver RX0 may monitor an interference level of the shared channel. Interference may be monitored in the same way or in a similar way as described above in FIG. 4 at 415 and at 435.

At 535, receiver RX0 may determine whether an interference level condition is satisfied for the shared channel. Determining whether the condition is satisfied may be determined in the same way or in a similar way as described above in FIG. 4 at 420 and at 440. If satisfied, the flow diagram 500 may return to block 530. Here, receiver RX0 permits the transmitter to remain in the contention-based mode when the interference level condition is satisfied, meaning that the interference level is high enough where interference mitigation techniques are needed to reduce interference on the shared channel. If the interference level condition is no longer satisfied, the flow diagram 500 may proceed to block 540.

At 540, receiver RX0 may instruct the transmitter to transition from operating in a contention-based mode to operate in a non-contention-based mode. Here, the interference level has been reduced meaning that interference mitigation techniques are no longer needed. If the transmitter is transmitter TX0, receiver RX0 may send a message via the established wireless link 305. If the transmitter is some other transmitter, such as transmitter TX1, with which receiver RX0 does not currently have an established wireless link, receiver RX0 may send a waveform that includes the identifier of the transmitter TX1 and an instruction to transition to operating in a non-contention-based mode. In another example, the receiver RX0 may send a message via a backhaul link. In any of these examples, the transmitter TX1 may receive the waveform or the message, determine that the waveform or message includes its identifier, and transition to operating in a non-contention-based mode.

In some instances, receiver RX0 may instruct the transmitter to transition to the non-contention-based mode only after determining that the interference level condition is no longer satisfied for at least a predetermined amount of time. The predetermined amount of time may be used to confirm that an interference level of the shared channel has been reduced more than temporarily, to avoid the transmitter TX0 from having to quickly transition back and forth between the contention-based mode and the non-contention-based mode within a short amount of time. In some examples, the transmitter TX0 may, instead or in addition to, make an independent determination of when to transition into and out of a contention-based mode. For example, the transmitter TX0 may receive an instruction from a receiver to enter a contention-based mode, and may perform some or all the operations shown in FIG. 4 to independently determine whether to transition to a contention-based mode and transition to a non-contention-based mode. The flow diagram 500 may return to 510 and may repeat one or more times.

The examples described herein may potentially provide significant SINR improvement when one or more strong interferers are silenced, and the SINR gain may be large enough to compensate for the reuse loss resulting from requiring one or more transmitters to perform a contention-based protocol prior to transmission.

FIG. 6 illustrates an example of a chart 600 for monitoring interference levels to selectively control usage of a contention-based protocol. The level of interference on a shared channel may vary over time and chart 600 depicts an example interference trace identifying interference level measurements at particular instances in time. In chart 600, interference is depicted on the y-axis and the level of interference increases from bottom to top, and time is depicted on the x-axis and increases from left to right. The chart 600 indicates time intervals in which a transmitter operates in a contention-based mode (e.g., LBT on), and in which a transmitter operates in a non-contention-based mode (e.g., LBT off).

In an example, a transmitter, a receiver, or both, may perform interference level measurements at fixed intervals, and the interference trace depicts the interference level as being flat until the next measurement. In other examples, interference level measurements may be performed more or less frequently, and may be filtered prior to using. The interference level condition may be deemed to be satisfied when, for example, a magnitude of the interference level exceeds a threshold (e.g., see dashed line 605). In another example, an interference level condition may be deemed to be satisfied when, for example, a statistical metric (e.g., average, median, etc.) of a particular time interval (e.g., see time interval 610) exceeds a historical value (e.g., average of particular time interval exceeds average of last N time intervals, where N may be 5, 10, 20, etc.). In another example, the interference level condition may be deemed to be satisfied when, for example, a difference between maximum and minimum values within a particular time interval (e.g., see time interval 610) exceeds a threshold. Other techniques as described herein and as would be appreciated by one having ordinary skill in the art may also be used for determining whether an interference level condition is satisfied.

Figure 7:
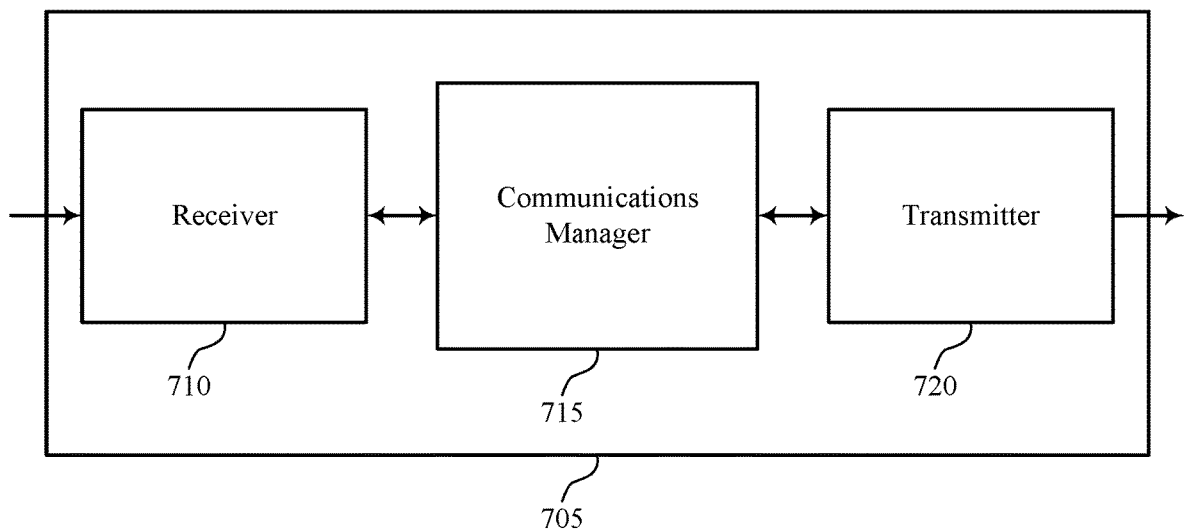
FIGS. 7 through 9 show block diagrams of a device that supports monitoring interference level to selectively control usage of a contention-based protocol in accordance with aspects of the present disclosure.

FIG. 7 shows a block diagram 700 of a wireless device 705 that supports monitoring interference levels to selectively control usage of a contention-based protocol in accordance with various aspects of the present disclosure. Wireless device 705 may be an example of aspects of a user equipment (UE) 115 or base station 105 as described with reference to FIG. 1. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to monitoring interference level to selectively control usage of a contention-based protocol, etc.). Information may be passed on to other components of the device. The receiver 710 may be an example of aspects of the transceiver 1035 described with reference to FIG. 10.

Communications manager 715 may be an example of aspects of the communications manager 1015 described with reference to FIG. 10.

Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Transmitter 720 may transmit, while operating in a non-contention-based mode for a wireless link with a second wireless device, a first beamformed data transmission to the second wireless device over a shared channel, and transmit, while operating in the non-contention-based mode for the wireless link with the second wireless device, a third beamformed data transmission to the second wireless device over the shared channel Communications manager 715 may determine that an interference level condition is satisfied for a shared channel and transition from operating in a non-contention-based mode to operating in a contention-based mode for a wireless link based on the interference level condition being satisfied. The communications manager 715 may also determine that a second wireless device is transmitting a beamformed data transmission over a shared channel while operating in a non-contention-based mode, determine that an interference level condition is satisfied for a wireless link over the shared channel, and instruct the second wireless device to transition from operating in the non-contention-based mode to operating in a contention-based mode based on the interference level condition being satisfied.

Transmitter 720 may also perform a contention-based protocol, while operating in the contention-based mode for the wireless link with the second wireless device, prior to transmission of a second beamformed data transmission to the second wireless device over the shared channel. In some cases, the contention-based protocol is a listen before talk (listen-before-talk (LBT)) protocol or a channel reservation (CR) LBT protocol. In some cases, the wireless link is between a second wireless device and the wireless device 705.

Figure 8:
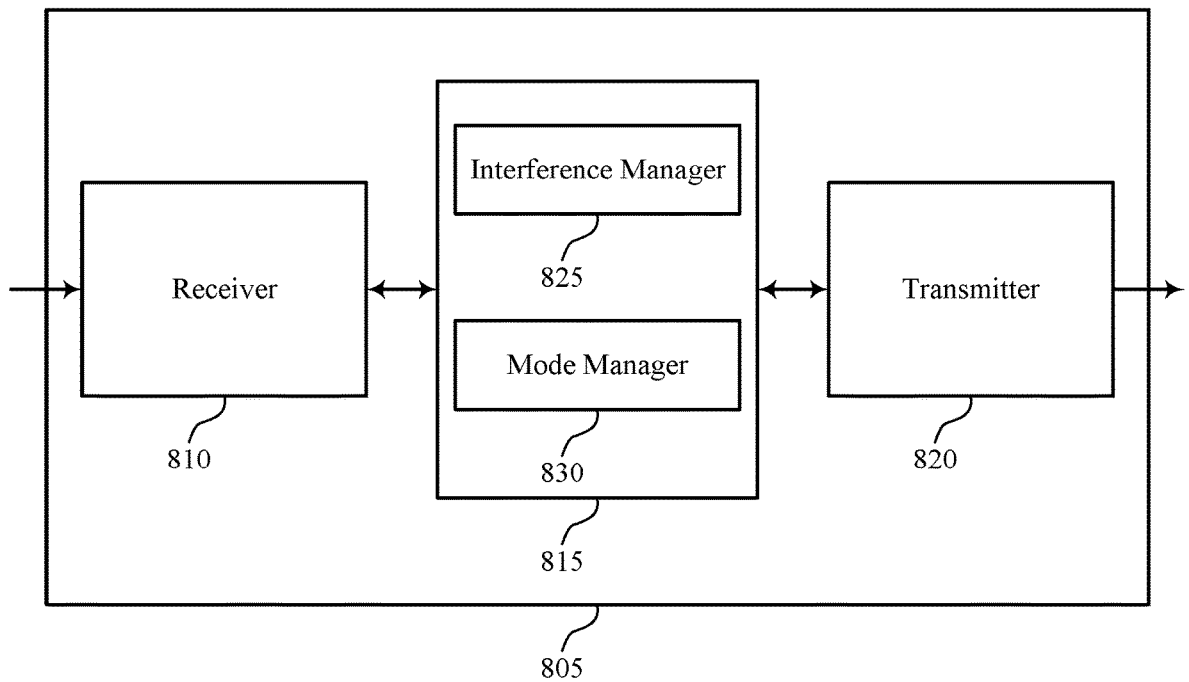

FIG. 8 shows a block diagram 800 of a wireless device 805 that supports monitoring interference levels to selectively control usage of a contention-based protocol in accordance with various aspects of the present disclosure. Wireless device 805 may be an example of aspects of a wireless device 705 or a UE 115 or base station 105 as described with reference to FIGS. 1 and 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to monitoring interference level to selectively control usage of a contention-based protocol, etc.). Information may be passed on to other components of the device. The receiver 810 may be an example of aspects of the transceiver 1035 described with reference to FIG. 10.

Communications manager 815 may be an example of aspects of the communications manager 1015 described with reference to FIG. 10. Communications manager 815 may also include interference manager 825 and mode manager 830.

Interference manager 825 may monitor interference on a wireless link. In some cases, monitoring interference on the wireless link includes determining a level of interference due to a second wireless link based on a reference signal (e.g., DMRS, PTRS, etc.). In some cases, monitoring interference on the wireless link includes determining a ratio of message acknowledgments to negative acknowledgments communicated by the second wireless device.

Interference manager 825 may determine that an interference level condition is satisfied for a shared channel. In some cases, determining that the interference level condition is satisfied includes determining that a magnitude of a level of the monitored interference satisfies a threshold. In some cases, determining that the interference level condition is satisfied includes determining that a variation in a level of monitored interference over a time period satisfies a threshold. In some cases, determining that the interference level condition is satisfied includes determining a difference between a maximum observed value of the monitored interference and a minimum observed value of the monitored interference within a time period. In some cases, determining that the interference level condition is satisfied includes determining that a level of the monitored interference satisfies a bursty metric. In some cases, determining that the interference level condition is satisfied includes monitoring interference on the wireless link. Interference manager 825 may identify a second wireless device as being a source of interference for the wireless link, and determine that an interference level condition is satisfied for a wireless link over the shared channel. Interference manager 825 may also determine that the interference level condition is no longer satisfied for the shared channel.

Mode manager 830 may transition from operating in the non-contention-based mode to operating in a contention-based mode for the wireless link based on the interference level condition being satisfied, transition from operating in the contention-based mode to operating in the non-contention-based mode for the wireless link based on the interference level condition no longer being satisfied. In some cases, mode manager 830 may determine that a second wireless device is transmitting a beamformed data transmission over a shared channel while operating in a non-contention-based mode, instruct the second wireless device to transition from operating in the non-contention-based mode to operating in a contention-based mode based on the interference level condition being satisfied, and instruct the second wireless device to transition from operating in the contention-based mode to operating in the non-contention-based mode based on the interference level condition no longer being satisfied. In some cases, instructing the second wireless device to transition from operating in the non-contention-based mode to operating in the contention-based mode includes communicating a message to the second wireless device via a backhaul link. In some cases, instructing the second wireless device to transition from operating in the non-contention-based mode to operate in the contention-based mode includes transmitting a signal waveform to the second wireless device.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
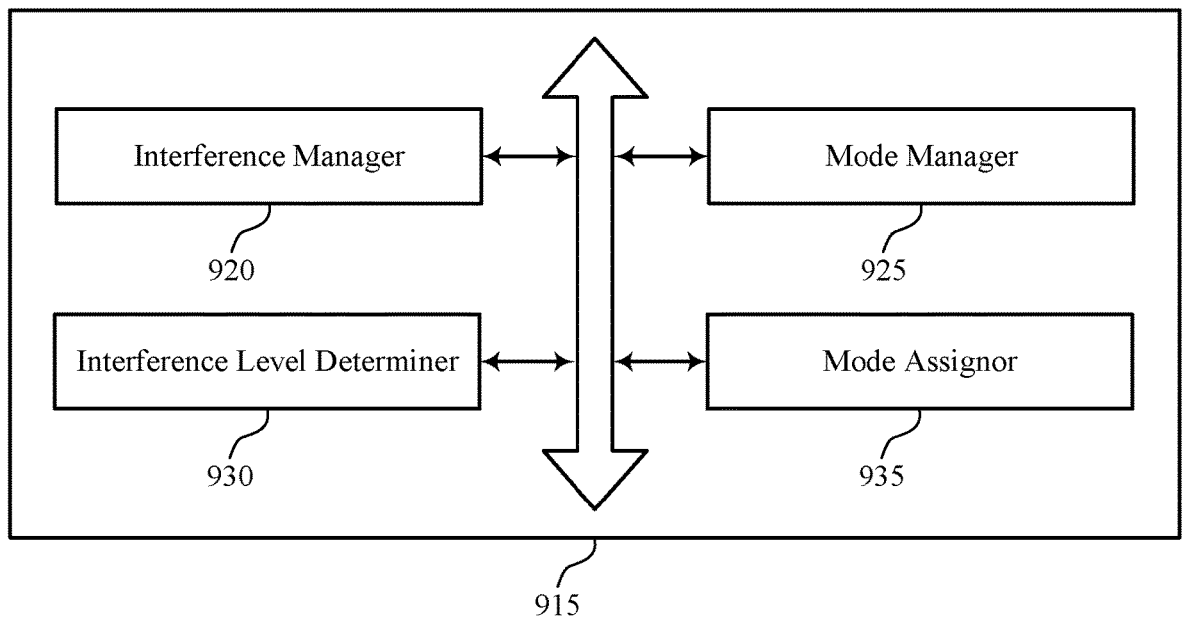

FIG. 9 shows a block diagram 900 of a communications manager 915 that supports monitoring interference levels to selectively control usage of a contention-based protocol in accordance with various aspects of the present disclosure. The communications manager 915 may be an example of aspects of a communications manager 715, a communications manager 815, or a communications manager 1015 described with reference to FIGS. 7, 8, and 10. The communications manager 915 may include interference manager 920, mode manager 925, interference level determiner 930, and mode assignor 935. Each of these modules may communicate, directly or indirectly, with one another (e.g., via one or more buses).

Interference manager 920 may monitor interference on the wireless link. In some cases, monitoring interference on the wireless link includes determining a ratio of acknowledgments to negative acknowledgments communicated by a second wireless device. In some cases, monitoring interference on the wireless link includes determining a level of interference due to a second wireless link based on a reference signal (e.g., DMRS, PTRS, etc.). In some cases, interference manager 920 may identify the second wireless device as being a source of interference for the wireless link. In some cases, interference manager 920 may identify interference from any beam direction.

In some cases, interference manager 920 may determine that an interference level condition is satisfied for the shared channel. In some cases, interference manager 920 may determine that the interference level condition is no longer satisfied for the shared channel.

Mode manager 925 may transition from operating in the non-contention-based mode to operating in a contention-based mode for the wireless link based on the interference level condition being satisfied, transition from operating in the contention-based mode to operating in the non-contention-based mode for the wireless link based on the interference level condition no longer being satisfied. In some cases, mode manager 925 may determine that a second wireless device is transmitting a beamformed data transmission over a shared channel while operating in a non-contention-based mode.

Interference level determiner 930 may determine that the interference level condition is satisfied includes determining that a magnitude of a level of the monitored interference satisfies a threshold. In some cases, determining that the interference level condition is satisfied includes determining that a variation in a level of monitored interference over a time period satisfies a threshold. In some cases, determining that the interference level condition is satisfied includes determining a difference between a maximum observed value of the monitored interference and a minimum observed value of the monitored interference within a time period. In some cases, determining that the interference level condition is satisfied includes determining that a level of the monitored interference satisfies a bursty metric. Interference level determiner 930 may determine that an interference level condition is satisfied based on interference that is detected in a particular beam direction.

Mode assignor 935 may instruct the second wireless device to transition from operating in the non-contention-based mode to operating in a contention-based mode based on the interference level condition being satisfied, and instruct the second wireless device to transition from operating in the contention-based mode to operating in the non-contention-based mode based on the interference level condition no longer being satisfied. In some cases, instructing the second wireless device to transition from operating in the non-contention-based mode to operating in the contention-based mode includes communicating a message to the second wireless device via a backhaul link. In some cases, instructing the second wireless device to transition from operating in the non-contention-based mode to operate in the contention-based mode includes transmitting a signal waveform to the second wireless device.

Figure 10:
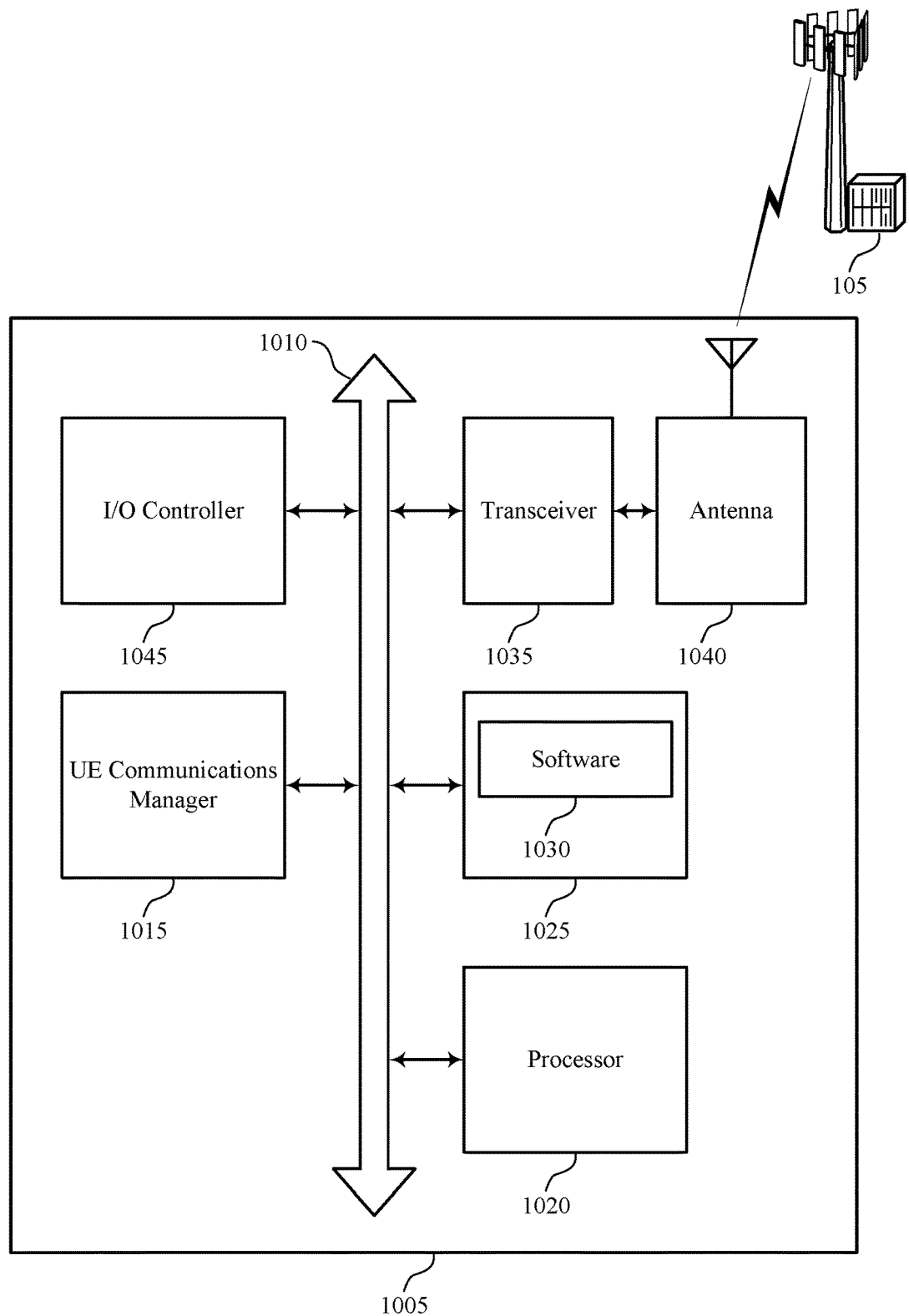
FIG. 10 illustrates a block diagram of a system including a user equipment (UE) that supports monitoring interference level to selectively control usage of a contention-based protocol in accordance with aspects of the present disclosure.

FIG. 10 shows a diagram of a system 1000 including a device 1005 that supports monitoring interference levels to selectively control usage of a contention-based protocol in accordance with various aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting monitoring interference level to selectively control usage of a contention-based protocol).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support monitoring interference level to selectively control usage of a contention-based protocol. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
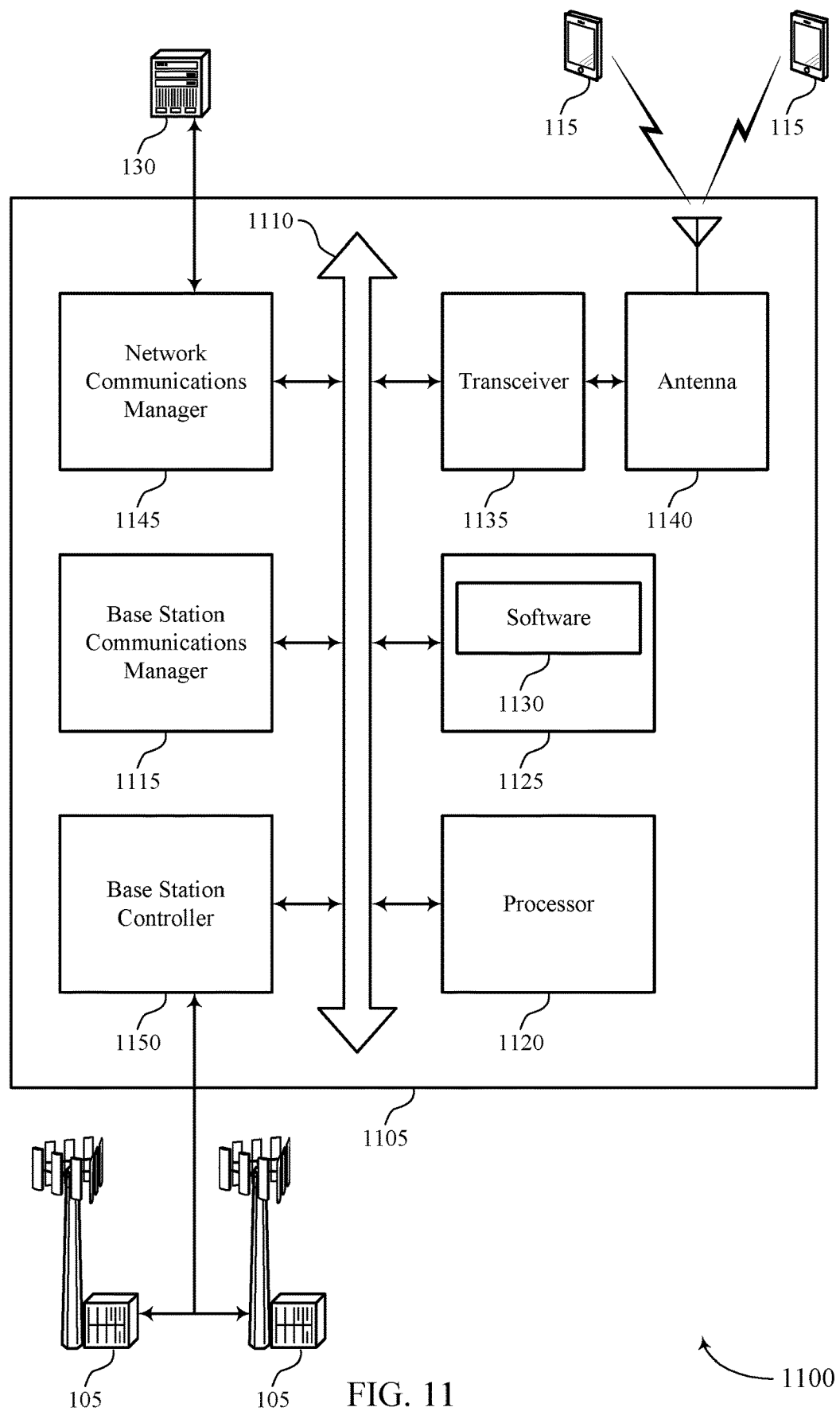
FIG. 11 illustrates a block diagram of a system including a base station that supports monitoring interference level to selectively control usage of a contention-based protocol in accordance with aspects of the present disclosure.

FIG. 11 shows a diagram of a system 1100 including a device 1105 that supports monitoring interference levels to selectively control usage of a contention-based protocol in accordance with various aspects of the present disclosure. Device 1105 may be an example of or include the components of wireless device 805, wireless device 905, or a base station 105 as described above, e.g., with reference to FIGS. 1, 8 and 9. Device 1105 may include components for bi-directional voice and data communications including components for transmitting and receiving communications, including base station communications manager 1115, processor 1120, memory 1125, software 1130, transceiver 1135, antenna 1140, network communications manager 1145, and base station controller 1150. These components may be in electronic communication via one or more busses (e.g., bus 1110). Device 1105 may communicate wirelessly with one or more UEs 115.

Base station communications manager 1115 may manage communications with other base station 105, and may include a controller or scheduler for controlling communications with UEs 115 in cooperation with other base stations 105. For example, the base station communications manager 1115 may coordinate scheduling for transmissions to UEs 115 for various interference mitigation techniques such as beamforming or joint transmission. In some examples, base station communications manager 1115 may provide an X2 interface within an Long Term Evolution (LTE)/LTE-A wireless communication network technology to provide communication between base stations 105.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting monitoring interference level to selectively control usage of a contention-based protocol).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware and/or software operation such as the interaction with peripheral components or devices.

Software 1130 may include code to implement aspects of the present disclosure, including code to support monitoring interference level to selectively control usage of a contention-based protocol. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Base station controller 1150 may manage communications with other base station 105, and may include a controller or scheduler for controlling communications with UEs 115 in cooperation with other base stations 105. For example, the base station controller 1150 may coordinate scheduling for transmissions to UEs 115 for various interference mitigation techniques such as beamforming or joint transmission. In some examples, base station controller 1150 may provide an X2 interface within an LTE/LTE-A wireless communication network technology to provide communication between base stations 105.

Figure 12:
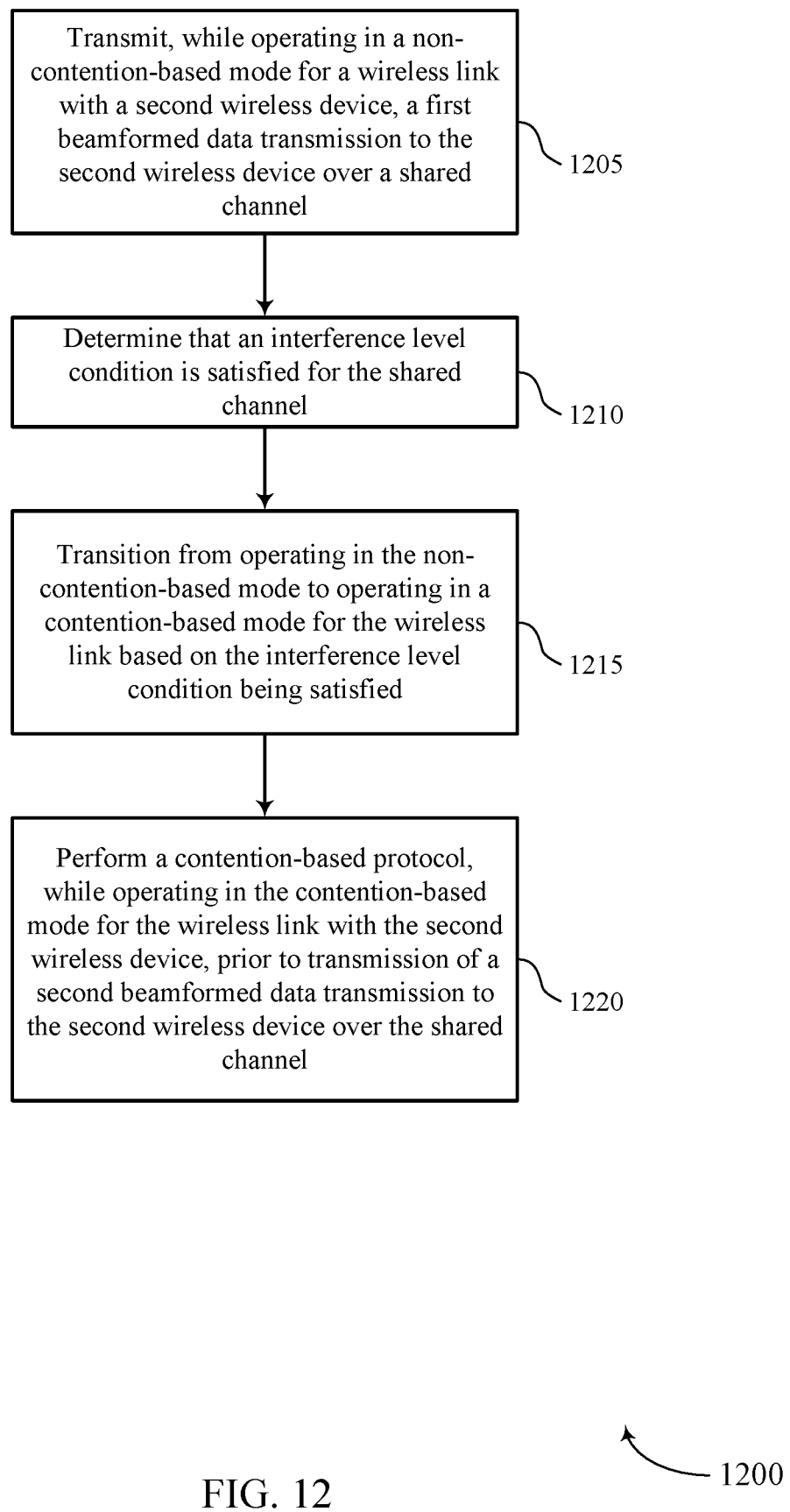
FIGS. 12 through 13 illustrate methods for monitoring interference level to selectively control usage of a contention-based protocol in accordance with aspects of the present disclosure.

FIG. 12 shows a flowchart illustrating a method 1200 for monitoring interference levels to selectively control usage of a contention-based protocol in accordance with various aspects of the present disclosure. The operations of method 1200 may be implemented by a UE 115 or base station 105 or its components as described herein. For example, the operations of method 1200 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may transmit, while operating in a non-contention-based mode for a wireless link with a second wireless device, a first beamformed data transmission to the second wireless device over a shared channel. The operations of block 1205 may be performed according to the methods described with reference to FIGS. 1 through 6. In certain examples, aspects of the operations of block 1205 may be performed by a transmitter as described with reference to FIGS. 7 through 9.

At block 1210 the UE 115 or base station 105 may determine that an interference level condition is satisfied for the shared channel. The operations of block 1210 may be performed according to the methods described with reference to FIGS. 1 through 6. In certain examples, aspects of the operations of block 1210 may be performed by an interference manager as described with reference to FIGS. 7 through 9.

At block 1215 the UE 115 or base station 105 may transition from operating in the non-contention-based mode to operating in a contention-based mode for the wireless link based at least in part on the interference level condition being satisfied. The operations of block 1215 may be performed according to the methods described with reference to FIGS. 1 through 6. In certain examples, aspects of the operations of block 1215 may be performed by a mode manager as described with reference to FIGS. 7 through 9.

At block 1220 the UE 115 or base station 105 may perform a contention-based protocol, while operating in the contention-based mode for the wireless link with the second wireless device, prior to transmission of a second beamformed data transmission to the second wireless device over the shared channel. The operations of block 1220 may be performed according to the methods described with reference to FIGS. 1 through 6. In certain examples, aspects of the operations of block 1220 may be performed by a transmitter as described with reference to FIGS. 7 through 9.

Figure 13:
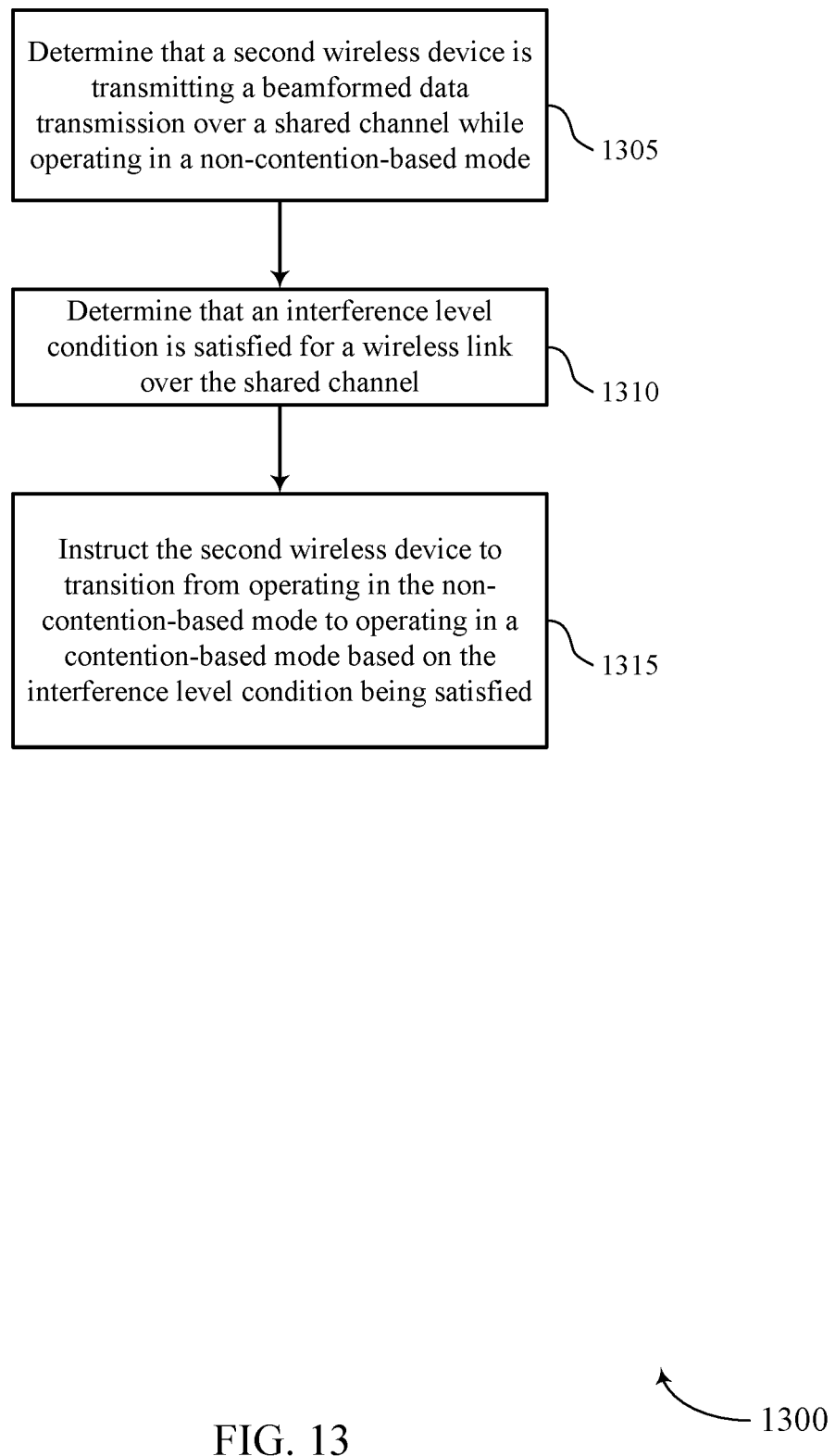

FIG. 13 shows a flowchart illustrating a method 1300 for monitoring interference levels to selectively control usage of a contention-based protocol in accordance with various aspects of the present disclosure. The operations of method 1300 may be implemented by a UE 115 or base station 105 or its components as described herein. For example, the operations of method 1300 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may determine that a second wireless device is transmitting a beamformed data transmission over a shared channel while operating in a non-contention-based mode. The operations of block 1305 may be performed according to the methods described with reference to FIGS. 1 through 6. In certain examples, aspects of the operations of block 1305 may be performed by a mode manager as described with reference to FIGS. 7 through 9.

At block 1310 the UE 115 or base station 105 may determine that an interference level condition is satisfied for a wireless link over the shared channel. The operations of block 1310 may be performed according to the methods described with reference to FIGS. 1 through 6. In certain examples, aspects of the operations of block 1310 may be performed by an interference manager as described with reference to FIGS. 7 through 9.

At block 1315 the UE 115 or base station 105 may instruct the second wireless device to transition from operating in the non-contention-based mode to operating in a contention-based mode based at least in part on the interference level condition being satisfied. The operations of block 1315 may be performed according to the methods described with reference to FIGS. 1 through 6. In certain examples, aspects of the operations of block 1315 may be performed by a mode manager as described with reference to FIGS. 7 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a first wireless device, comprising:
    transmitting, while operating in a non-contention-based mode for a wireless link with a second wireless device, a first beamformed data transmission to the second wireless device over a shared channel;
    determining that an interference level condition is not satisfied for the shared channel to initiate a timer based at least in part on monitoring a first ratio of message acknowledgments to negative acknowledgments;
    determining that the interference level condition is satisfied for the shared channel based at least in part on monitoring a second ratio of message acknowledgments to negative acknowledgments subsequent to expiration of the timer;
    transitioning from operating in the non-contention-based mode to operating in a contention-based mode for the wireless link based at least in part on the interference level condition being satisfied; and
    performing a contention-based protocol, while operating in the contention-based mode for the wireless link with the second wireless device, prior to transmission of a second beamformed data transmission to the second wireless device over the shared channel.

2. The method of claim 1, further comprising:
    determining that the interference level condition is no longer satisfied for the shared channel;
    transitioning from operating in the contention-based mode to operating in the non-contention-based mode for the wireless link based at least in part on the interference level condition no longer being satisfied; and
    transmitting, while operating in the non-contention-based mode for the wireless link with the second wireless device, a third beamformed data transmission to the second wireless device over the shared channel.

3. The method of claim 1, further comprising:
    monitoring interference on the wireless link.

4. The method of claim 3, wherein monitoring interference on the wireless link comprises:
    determining a level of interference due to a second wireless link based at least in part on a reference signal (RS), a demodulation reference signal (DMRS), a phase tracking reference signal (PTRS), or any combination thereof.

5. The method of claim 3, wherein determining that the interference level condition is satisfied comprises:
    determining that a level of the monitored interference satisfies a bursty metric.

6. The method of claim 3, wherein determining that the interference level condition is satisfied comprises:
    determining that a magnitude of a level of the monitored interference satisfies a threshold.

7. The method of claim 3, wherein determining that the interference level condition is satisfied comprises:
    determining that a variation in a level of the monitored interference over a time period satisfies a threshold.

8. The method of claim 3, wherein determining that the interference level condition is satisfied comprises:
    determining a difference between a maximum observed value of the monitored interference and a minimum observed value of the monitored interference within a time period; and
    determining that the difference satisfies a threshold.

9. The method of claim 1, wherein the contention-based protocol is a listen before talk (LBT) protocol or a channel reservation (CR) LBT protocol.

10. The method of claim 1, wherein determining that the interference level condition is satisfied for the shared channel comprises:
    detecting interference in a particular beam direction;
    wherein the interference level condition is based at least in part on the detected interference.

11. The method of claim 1, wherein determining that the interference level condition is satisfied for the shared channel further comprises:

determining a ratio of an average number of message acknowledgments within a time interval to an average number of negative acknowledgements within the time interval.

12. A method for wireless communication by a first wireless device, comprising:
   determining that a second wireless device is transmitting a beamformed data transmission over a shared channel while operating in a non-contention-based mode;
   determining that an interference level condition is not satisfied for a wireless link over the shared channel to initiate a timer based at least in part on monitoring a first ratio of message acknowledgments to negative acknowledgments;
   determining that the interference level condition is satisfied for the wireless link over the shared channel based at least in part on monitoring a second ratio of message acknowledgments to negative acknowledgments subsequent to expiration of the timer; and
   instructing the second wireless device to transition from operating in the non-contention-based mode to operating in a contention-based mode based at least in part on the interference level condition being satisfied.

13. The method of claim 12, wherein instructing the second wireless device to transition from operating in the non-contention-based mode to operate in the contention-based mode comprises:
   transmitting a signal waveform to the second wireless device.

14. The method of claim 12, further comprising:
   determining that the interference level condition is no longer satisfied; and
   instructing the second wireless device to transition from operating in the contention-based mode to operating in the non-contention-based mode based at least in part on the interference level condition no longer being satisfied.

15. The method of claim 12, wherein determining that the interference level condition is satisfied comprises:
   monitoring interference on the wireless link.

16. The method of claim 15, wherein monitoring the interference on the wireless link comprises:
   determining a level of interference caused by the second wireless device based at least in part on a reference signal (RS), a demodulation reference signal (DMRS), a phase tracking reference signal (PTRS), or any combination thereof.

17. The method of claim 15, wherein determining that the interference level condition is satisfied comprises:
   determining that a level of the monitored interference satisfies a bursty metric.

18. The method of claim 15, wherein determining that the interference level condition is satisfied comprises:
   determining that a magnitude of a level of the monitored interference satisfies a threshold.

19. The method of claim 15, wherein determining that the interference level condition is satisfied comprises:
   determining that a variation in a level of the monitored interference over a time period satisfies a threshold.

20. The method of claim 15, wherein determining that the interference level condition is satisfied comprises:
   determining a difference between a maximum observed value of the monitored interference and a minimum observed value of the monitored interference within a time period; and
   determining that the difference satisfies a threshold.

21. The method of claim 12, wherein the contention-based mode is associated with a contention-based protocol that is a listen before talk (LBT) protocol or a channel reservation (CR) LBT protocol.

22. An apparatus for wireless communication, in a system that includes a first wireless device, the apparatus comprises:
   a processor;
   memory in electronic communication with the processor; and
   instructions stored in the memory and operable, when executed by the processor, to cause the apparatus to:
      transmit, while operating in a non-contention-based mode for a wireless link with a second wireless device, a first beamformed data transmission to the second wireless device over a shared channel;
      determine that an interference level condition is not satisfied for the shared channel to initiate a timer based at least in part on monitoring a first ratio of message acknowledgments to negative acknowledgments;
      determine that the interference level condition is satisfied for the shared channel based at least in part on monitoring a second ratio of message acknowledgments to negative acknowledgments subsequent to expiration of the timer;
      transition from operating in the non-contention-based mode to operating in a contention-based mode for the wireless link based at least in part on the interference level condition being satisfied; and
      perform a contention-based protocol, while operating in the contention-based mode for the wireless link with the second wireless device, prior to transmission of a second beamformed data transmission to the second wireless device over the shared channel.

23. The apparatus of claim 22, wherein the instructions are further executable by the processor to:
   determine that the interference level condition is no longer satisfied for the shared channel;
   transition from operating in the contention-based mode to operating in the non-contention-based mode for the wireless link based at least in part on the interference level condition no longer being satisfied; and
   transmit, while operating in the non-contention-based mode for the wireless link with the second wireless device, a third beamformed data transmission to the second wireless device over the shared channel.

24. The apparatus of claim 22, wherein the instructions are further executable by the processor to:
   monitor interference on the wireless link; and
   wherein monitoring interference on the wireless link comprises instructions further executable by the processor to:
      determine a level of interference due to a second wireless link based at least in part on a reference signal (RS), a demodulation reference signal (DMRS), a phase tracking reference signal (PTRS), or any combination thereof.

25. The apparatus of claim 22, wherein determining that the interference level condition is satisfied comprises instructions further executable by the processor to:
   monitor interference on the wireless link; and
   determine that a second difference satisfies a second threshold, the second difference calculated between a maximum observed value of the monitored interference and a minimum observed value of the monitored interference within a time period; or determine that a level of the monitored interference satisfies a bursty metric; or determine that a magnitude of a level of the monitored interference satisfies a third threshold; or any combination thereof.

26. The apparatus of claim 22, wherein determining that the interference level condition is satisfied comprises instructions further executable by the processor to:

detect interference in a particular beam direction, wherein the interference level condition is determined to be satisfied based at least in part on the detected interference.

27. An apparatus for wireless communication, in a system that includes a first wireless device, the apparatus comprising:

a processor;

memory in electronic communication with the processor; and instructions stored in the memory and operable, when executed by the processor, to cause the apparatus to:

determine that a second wireless device is transmitting a beamformed data transmission over a shared channel while operating in a non-contention-based mode;

determine that an interference level condition is not satisfied for a wireless link over the shared channel to initiate a timer based at least in part on monitoring a first ratio of message acknowledgments to negative acknowledgments;

determine that the interference level condition is satisfied for the wireless link over the shared channel based at least in part on monitoring a second ratio of message acknowledgments to negative acknowledgments subsequent to expiration of the timer; and instruct the second wireless device to transition from operating in the non-contention-based mode to operating in a contention-based mode based at least in part on the interference level condition being satisfied.

28. The apparatus of claim 27, wherein the instructions are further executable by the processor to:

determine that the interference level condition is no longer satisfied; and instruct the second wireless device to transition from operating in the contention-based mode to operating in the non-contention-based mode based at least in part on the interference level condition no longer being satisfied.

29. The apparatus of claim 27, wherein determining that the interference level condition is satisfied comprises instructions further executable by the processor to:

monitor interference on the wireless link; and wherein monitoring the interference on the wireless link comprises instructions further executable by the processor to:

determine a level of interference caused by the second wireless device based at least in part on a reference signal (RS), a demodulation reference signal (DMRS), a phase tracking reference signal (PTRS), or any combination thereof.

30. The apparatus of claim 27, wherein determining that the interference level condition is satisfied comprises instructions further executable by the processor to:

monitor interference on the wireless link; and determine that a second difference satisfies a second threshold, the second difference calculated between a maximum observed value of the monitored interference and a minimum observed value of the monitored interference within a time period; or determine that a level of the monitored interference satisfies a bursty metric; or determine that a magnitude of a level of the monitored interference satisfies a third threshold; or any combination thereof.

* * * * *